US006707487B1

(12) United States Patent
Aman et al.

(10) Patent No.: US 6,707,487 B1
(45) Date of Patent: Mar. 16, 2004

(54) METHOD FOR REPRESENTING REAL-TIME MOTION

(75) Inventors: James A. Aman, Souderton, PA (US); William R. Haller, Bethlehem, PA (US)

(73) Assignee: In The Play, Inc., Hatfield, PA (US)

( * ) Notice: Subject to any disclaimer, the term of this patent is extended or adjusted under 35 U.S.C. 154(b) by 0 days.

(21) Appl. No.: 09/510,922

(22) Filed: Feb. 22, 2000

Related U.S. Application Data

(63) Continuation-in-part of application No. 09/197,219, filed on Nov. 20, 1998, now Pat. No. 6,567,116.

(51) Int. Cl.[7] .............................................. H04N 5/225
(52) U.S. Cl. ........................................ 348/169; 348/77
(58) Field of Search ........................ 701/300; 364/156; 348/169, 162, 164, 208.14, 77; 250/203; 382/103; 702/150, 151, 152; H04N 5/225

(56) References Cited

U.S. PATENT DOCUMENTS

| 3,944,738 A | 3/1976 | Johnson |
| 4,539,590 A | 9/1985 | Gage |
| 4,545,576 A | 10/1985 | Harris |
| 4,664,378 A | 5/1987 | Van Auken |
| 4,673,183 A | 6/1987 | Trahan |

(List continued on next page.)

FOREIGN PATENT DOCUMENTS

| EP | 0 300 729 | 1/1989 |
| EP | 0 813 040 | 12/1997 |

(List continued on next page.)

OTHER PUBLICATIONS

Qualisys North America Home Page—Precision 3D Motion Capture (May 25, 2001).

(List continued on next page.)

*Primary Examiner*—Nhon Diep

(57) ABSTRACT

A system 100 for tracking the movement of multiple objects within a predefined area using a continuation of overhead X-Y tracking cameras 24 with attached frequency selective filter 24f. Also employed are perspective Z filming cameras sets 30. Objects to be tracked, such as player 17, have been marked to include some form of frequency selective reflective material such as an ink. Typical markers include patches 7r and 7l, sticker 9 and tape 4a as well as additional body joint markers 17af through 17l. System 100 radiates selected energy 23a throughout the predefined area of tracking that is specifically chosen to reflect off said reflective materials used to mark for instance player 17. The reflected energy is then received by tracking cameras 24 while all other ambient light is blocked by filter 24f. Local Computer System 60 continuously captures images from said tracking cameras 24 which include only the minimum information created by said reflected energy. System 60 efficiently locates said markings on said multiple objects and uses this location information to determine for each marking its angle of rotation, angle of azimuth and distance from a designated origin 17o local to player 17. Local origin 17o is then expressed as a three-dimensional coordinate with respect to the origin of the playing venue 2a. The continuous stream of tracked three-dimensional coordinates, defining the body joints on players such as 17, is then transmitted to a remote computer where it can be used to drive a graphic re-animation of the object movement. Along with this re-animation, additional performance measurements may be derived from the continuous stream and automatically made available in real-time.

32 Claims, 10 Drawing Sheets

U.S. PATENT DOCUMENTS

| | | | |
|---|---|---|---|
| 4,675,816 | A | 6/1987 | Brandon et al. |
| 4,764,668 | A | 8/1988 | Hayard |
| 4,866,414 | A | 9/1989 | Diaconu et al. |
| 4,905,315 | A | 2/1990 | Solari et al. |
| 4,980,871 | A | 12/1990 | Sieber et al. |
| 5,082,263 | A | 1/1992 | Berger |
| 5,138,322 | A | 8/1992 | Nuttall |
| 5,150,895 | A | 9/1992 | Berger |
| 5,268,734 | A | 12/1993 | Parker et al. |
| 5,346,210 | A | 9/1994 | Utke et al. |
| 5,363,297 | A | 11/1994 | Larson et al. |
| 5,394,824 | A | 3/1995 | Johnson, Jr. |
| 5,401,026 | A | 3/1995 | Eccher et al. |
| 5,413,345 | A | 5/1995 | Nauck |
| 5,446,701 | A | 8/1995 | Utke et al. |
| 5,471,383 | A | 11/1995 | Gobush et al. |
| 5,473,369 | A | 12/1995 | Abe |
| 5,485,163 | A | 1/1996 | Singer et al. |
| 5,489,886 | A | 2/1996 | Wexler et al. |
| 5,504,477 | A | 4/1996 | Whitright et al. |
| 5,508,736 | A | 4/1996 | Cooper |
| 5,564,698 | A | 10/1996 | Honey et al. |
| 5,617,335 | A | 4/1997 | Hashima et al. |
| 5,700,204 | A | 12/1997 | Teder |
| 5,731,785 | A | 3/1998 | Lemelson et al. |
| 5,734,343 | A | 3/1998 | Urbish et al. |
| 5,768,151 | A | 6/1998 | Lowy et al. |
| 5,900,978 | A | 5/1999 | Sagar et al. |
| 5,912,700 | A | 6/1999 | Honey et al. |
| 6,061,644 | A * | 5/2000 | Leis ............................ 702/153 |
| 6,073,489 | A * | 6/2000 | French et al. ............ 73/379.01 |
| 6,308,565 | B1 * | 10/2001 | French et al. ............ 73/379.04 |

FOREIGN PATENT DOCUMENTS

| | | |
|---|---|---|
| EP | 0 959 444 | 11/1999 |
| FR | 2 726 370 | 5/1996 |
| GB | 2 191 361 | 12/1987 |
| WO | WO 95/10915 | 4/1995 |
| WO | WO 97/02699 | 1/1997 |
| WO | WO 98/46029 | 10/1998 |
| WO | WO 99/44698 | 9/1999 |
| WO | WO 00/31560 | 6/2000 |

OTHER PUBLICATIONS

Vicon 512 product information of Oxford Metrics Ltd. (Feb. 1999).

Vicon 250 product infrormation of Oxford Metrics Ltd. (at least as early as Feb. 1999).

Vicon Cameras product information of Vicon Motion Systems Ltd. (Mar. 2001).

Vicon 8 product information of Vicon Motion Systems Ltd. (Aug. 2001).

Visualeyez™ Tracking Unit Specifications of PTI 3D Motion–Tracking Systems (Aug. 2001).

ELITEPlus Motion Analyser product information (Aug. 2001).

RealTime Hires 3D System product information of Motion Analysis Corporation (Aug. 27. 2001).

Peak Performance Technologies, Inc. product information (Aug. 2001).

Northern Digital Inc. product information (Aug. 2001).

Micromak GmbH product information (Aug. 2001).

Ariel Dynamics Inc. product information (Aug. 2001).

Saga—$3^{RT}$ product information (Aug. 2001).

CODA System product information of Charnwood Dynamics Ltd. (Aug. 2001).

"Trakus Inc.'s Technology Tracks Athletes' Every Move," Boston Business Journal (Oct. 23–29, 1998).

"Gauging The Big Hit," Popular Science, vol. 254, No. 4 (Apr. 1999).

"Stats With Impact," The New York Times, Sec 6 (Nov. 22, 1998).

"Body Speed, Power Stats Going Digital," Street & Smith's Sportsbusiness Journal, vol. 1, Issue 33 (Dec. 7–13, 1998).

"How Hard is a Football Hit?," Inventor's Business Daily (Oct. 23, 1998).

* cited by examiner

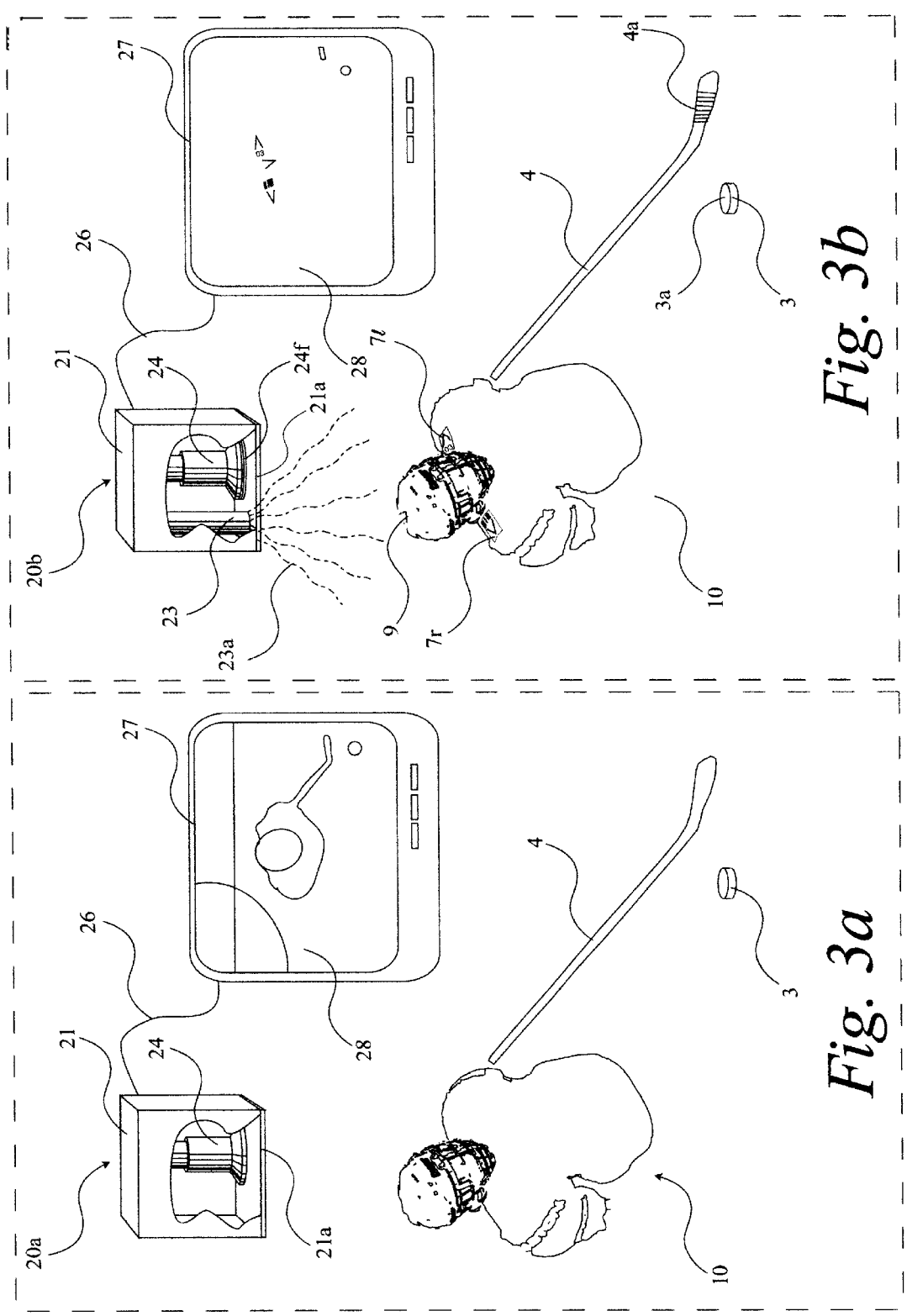

METHOD FOR REPRESENTING REAL-TIME MOTION

RELATED APPLICATION

The present invention is a continuation in part of U.S. patent application Ser. No. 09/197,219, filed Nov. 20, 1998 now U.S. Pat. No. 6,567,116.

FIELD OF INVENTION

The present invention relates to systems for tracking the movement of multiple objects within a predefined area.

DESCRIPTION OF PRIOR ART

As camera, micro-electronic and computer system technology continues to advance at a great pace there has been an increasing supply of machine vision systems intended to replace well defined, repetitive vision/recognition tasks which had previously been performed by humans. Early systems were designed to recognize parts moving along assembly lines to aid the manufacturing process. More recently, many inventions have been put forth to recognize humans and there movement. The variability of humans and their clothing as well as the complexity of the backgrounds within which they endeavor has presented a significant challenge to state-of-the-art technology. Considerable attention has been paid to various techniques for discerning the human shape from its background using edge detection techniques that look to remove stationary, i.e. background, information. There are two major factors that effect the success of these various techniques. The first is image resolution, which drives the amount of information and hence detail that is available to the accompanying computer system in order to differentiate foreground from background. Ideally the greater the resolution the better. However as resolution increasing so does the cost of the camera as well as the accompanying computer system. Even more importantly, as resolution increases time to process increases significantly. And as time to process increases the ability for these systems to perform real-time operations is impeded.

The following are seven examples of machine vision systems designed in some way or another to recognize human or object motion from within a predefined area.

In November of 1994 U.S. Pat. No. 5,363,297 entitled Automated Camera-Based Fracking System for Sports Contests issued to Larson et al. This system employed multiple cameras to continuously monitor the area of an ongoing sporting event. Each camera would feed its information to an accompanying computer system for analysis that consisted of extracting the players from the stationary background and thereby tracking their silhouettes. The inventor had anticipated problems when the individual players would collide or otherwise engage each other and hence merging their individual silhouettes. A need was also recognized to initialize the system by first identifying each player as they appeared within the system's field of view. Larson et al. specified two solutions for these problems. First, they proposed attaching monitors to the tracking system that would be operated by humans who would perform the initial recognition as well as all subsequent re-identifications when the system lost track of a player due to a merging of silhouettes. Secondly, they proposed attaching electronic tracking devices and employing triangulation of received signals in order to identify and track individual players. There are at least four major problems with the Larson patent. First, the amount of digital processing required to perform the player extraction in real time greatly exceeds the cost-effective computer technology of today, let alone 1994. Secondly, in order to perform this extraction, a greater amount of detail would be necessary which would thereby increase the cost of implementation by requiring more cameras and related computer systems. And of course the additional detail would only tend to further slow down the responsiveness of the system. Thirdly, the requirement of one or more operators to initially recognize and then re-identify players is extremely limiting and costly. This requirement essentially made the patent economically impractical for monitoring non-professional youth sporting events, where the system cost including the ongoing cost of the human operator would greatly exceed smaller revenue streams. It should be noted that this operator would more than likely be a parent of one of the youths who would probably be unfamiliar with all of the players and who would more than likely find it stressful to make so many decisions in real time. This approach would also require training and retraining operators, which would also be prohibitive. Fourthly, the type of electronics necessary to track players in real time would have to operate at higher frequencies that would also mean that it would be more expensive, providing a further economic drawback. The fifth major problem is that the system could have a difficult time determining the orientation of the player. For example, while Larson's invention could detect the direction of an individual's motion, it could not determine if the person was facing forwards or backwards, let alone if the person's head was turning in another direction.

In December of 1995, U.S. Pat. No. 5,473,369 entitled Object Tracking Apparatus issued to Keiko Abe. This system was concerned with the actual image processing techniques used to follow an object from frame to frame. The inventor described prior art that compared the images block by block from one frame to the next, where a block is assumed to be one or more pixels of the image. It was pointed out that such systems depended upon time consuming and error prone statistical calculations that were especially susceptible to misinterpretation when the object changed size within the field of view or disappeared altogether. Abe proposed taking the same video frames but first separating them into luminance and color histograms that are then to be compared frame by frame. By comparing the histograms rather than blocks Abe argued that the system would be more accurate and efficient that the block matching systems. However, there are at least five major problems with Abe's patent. First, the effectiveness and reliability of this technique is highly dependent upon the lighting conditions initially and over time within the field of view being tracked. For instance, if the initial frame was taken under a well-lit condition, the luminance histograms of the object may be ideal. However, when the lighting conditions are poor to begin with, or worse yet change from frame to frame as might happen with sudden burst of ambient light, the luminance histograms will be subject to considerable error. Secondly, relying upon color histograms is equally uncertain due partly to the susceptibility of color detection to lighting conditions, which again may vary from frame to frame, and in part to the potential for object and background blurring when color schemes overlap. A third problem is that Abe's system does not lend itself to tracking multiple objects that may have similar or identical luminance/color information and which may overlap from frame to frame. A forth problem is discussed in Abe's specification that indicates a requirement of a human operator to initialize the system by selecting the portion of the video image which contains the object to be tracked, his so-called region designating frame.

This requirement would be even more restrictive when consideration is given to multiple object tracking where the objects may go in and out of the field of view of temporarily overlap each other. And finally, a fifth problem is alluded to in the specification where it is expressed as an opportunity of the system to automatically control the pan, tilt and zoom of a camera. In so doing, Abe states that the system is capable of "coping with any change in the in the size of the object and which can photograph the target object always in a desirable size, thereby attaining a substantial improvement in terms of the facility with which the apparatus can be used." Hence, it is recognized that this method/apparatus is still very resolution dependent similar to the block methods it is attempting to improve upon.

In April of 1997, U.S. Pat. No. 5,617,335 entitled System for and Method of Recognizing and Tracking Target Mark issued to Hashima et al. This invention is attempting to address the problem of determining the three-dimensional coordinates of an object with respect to a tracking camera and processing mechanism, e.g. a robotic ann from a single two-dimensional image. He expresses these coordinates as the attitude and position of a target mark that has been placed upon the object to be tracked. In Hashima's review of the prior art he lists several existing methods many of which require too many calculations and or have problems with multiple objects and background image noise. He discloses a technique for marking the object to be tracked with a white triangle inside of a black circle. Once the special markings are captured, they are quickly converted into projected histograms in the X and Y directions of the image of the triangle mark after which the centers of gravity as well as the maximum histogram values in the X and Y directions are also determined. All of this information is then collectively used for "determining which of classified and preset attitude patterns the attitude of the triangle of said target mark belongs to based upon the position of the centers of gravity, the maximum histogram values, the X and Y-axis values, and the known geometrical data of said target mark". Even taking Hashima's assertion of increased efficiency and accuracy, his technique has at least three major limitations. First, the object to be tracked must be marked in a highly accurate fashion and this mark must be visible to the tracking camera at all times. No provision has been disclosed at to how the object can be tracked if the markings are temporarily blocked from the view of the tracking camera. Secondly, by attempting to determine three dimension information from a single two dimensional image, Hashima is focusing his solution on situations were additional perspective cameras may not be available. Given such additional cameras, there exist even more efficient and accurate methods for determining the third dimension. Thirdly, this invention teaches of a system which functions well "even when an image either contains many objects or has a lot of noises". However, if every one of these multiple objects needed to be tracked within the same image, Hashima's invention would not be at optimal performance since at any given time the preferred orientation of camera to object cannot be simultaneously maintained for multiple objects scattered in three dimensions.

In March of 1998, U.S. Pat. No. 5,731,785 entitled System and Method for Locating Objects Including an Inhibiting Feature issued to Lemelson et al. This invention teaches the tracking of objects by "an electronic code generating system or device carried by the object in a portable housing". This "system or device" is specified to receive locating signals such as from the GPS constellation or a ground based triangulation setup. It then uses these signals to determine it's own location. Lemelson anticipates that at some point in time operators of a remote tracking system may be interested in the exact whereabouts of one individual object from amongst the multiplicity of objects that are housing such tracking devices. In order to determine the objects location, the tracking system will first transmit a unique "inquiry signal" coded for one particular device in one particular object. All of the individual tracking devices will then receive this signal but only the one device whose identifying code matches the "inquiry signal" will respond. This response is in the form of a transmission that includes the tracking devices currently determined location. The tracking system then receives this signal and displays on a computer system monitor related information about the identified/located object. Lemelson et al.'s invention is primarily applicable to the tracking of many objects over a very wide area, so wide that these objects are out of range of any reasonably sized camera tracking system. As an apparatus and method for tracking objects that are within a range suitable for a camera network, this invention has at least three major problems. First, it requires that each object have the capability to constantly monitor and track its own location. Such a requirement involves the use of a computing device which must be set up to receive GPS or other tracking signals and also transmit locating signals. Such a device will typically take up more space than a marking or indicia that can be placed on an object and then tracked with a camera. Furthermore, this device will require power. Secondly, Lemelson et al.'s invention assumes that the remote tracking station is only interested in one or a smaller fraction of all potential objects at a given time. However, there are many situations when it is desirous to follow the exact and continuous movements of all tracked objects as they move about within a predefined area. Whereas it is conceivable that this invention could constantly transmit "inquiry signals" for all objects and constantly receive locating signal responses, it is anticipated that this amount of information would unacceptably limit the movement resolution of the system. Thirdly, such an electronic based system has no understanding of an object's orientation with respect to it's direction of movement. Hence, while it is possible to determine the direction a car or person being tracked is moving, it is not shown how the system could determine if that same car or person was facing or turned away from it's current direction of travel.

In June of 1998, U.S. Pat. No. 5,768,151 entitled System for Determining the Trajectory of an Object in a Sports Simulator issued to Lowery et al. This invention teaches the use of stereoscopic cameras trained upon a limited field of view to follow the trajectory of an anticipated object. As the object transverses the field of view the cameras capture images at a suitably slower rate such that the object creates a blur as it moves. This blurred path is then analyzed and converted into the object's trajectory vectors within the field of view. Another key means of Lowery et al.'s apparatus is its ability to determine when it should begin tracking. As such a sound detecting device is specified to sense the presence of the object within the field of view after which the image capture system is then immediately activated. There are at least four major limitations with Lowery et al.'s invention that would hinder its broader applicability. First, this invention expects a very narrow range of motion of the object and as such has a significantly restricted field of view. If the concept were to be applied to a larger area then multiple perspective cameras would need to be employed. The system would then also need to determine which cameras should be activated once the object is detected to be traveling within the tracking region. However, without actually first determining where the object is located, say for instance by attempting to triangulate the sound emitted by the object, the system would have no idea which cameras to activate. Hence all cameras would need to capture images creating a very large set of data that would need to be parsed by the tracking computer in order to determine the location of the object. The second limitation is that this system does not attempt to uniquely identify each object that it senses. Hence, while it is capable of determining a trajectory vector for individual objects, it does not anticipate a need for, nor disclose a method of determining the unique identity of each object as it passes by. The third limitation deals with the ability to track multiple objects simultaneously within this same field of view. Since this invention anticipates only one object at a time, it is merely determining trajectory vectors, and not the object's identity. Hence if two or more objects are traveling throughout the tracking region and they collide in such a way as to effect each other's path of travel, then the system will be left to determine which object continued on which path after the merge event. The forth limitation deals with the systems inability to pick up the object from its background when there is insufficient color and or luminescence difference between the two.

All of the above listed prior art in one way or another was attempting to track the movement of at least one object within a predefined area. When taken in combination, their limitations that must be overcome in total are as follows:

1—If the tracking system attempts to differentiate between the object and its background purely on the basis of pixel by pixel comparison as does Larson et al., then the video image must have higher resolution to be accurate and the resulting computer processing time prohibits real time operation.

2—If the tracking system attempts to reduce processing time by performing averaging techniques based upon separated color and luminescence information as does Abe, then accuracy is compromised especially as colors merge between multiple objects and their background or lighting conditions fluctuate substantially between image frames. Such reduction techniques are further hampered as object size diminishes which essentially reduces the amount of object versus background information thereby increasing "noise". The only solution is to zoom in on the object being tracking to keep the proper ratio of object to background information. This then implies that each object being tracked must have its own camera thereby greatly reducing the effectiveness of these techniques for tracking either more objects and/or greater fields of view.

3—If the tracking system such as Lowery et al.'s employs two perspective cameras and an image blurring technique to capture three-dimensional trajectory information it reduces image processing requirements but looses important video image detail.

4—If the tracking system such as Hashima et al.'s employs detailed indicia placed upon the object to be tracked, this can be effective to reduce the amount of image processing. However, Hashima faces significant issues when trying to determine three-dimensional information from a single two-dimensional image, which is one of his mandatory requirements. His resultant techniques preclude the tracking of multiple fast moving objects over wider fields of view where the object's indicia may at times be blocked from view or at least be at significantly changing perspectives from the tracking camera.

5—All of the video/camera only based techniques such as Larson, Abe, Hashima and Lowery are prone to error if they were to track multiple objects whose paths would intersect and/or collide. Only Larson specifically anticipates this type of multiple object tracking and suggests the use of human operators to resolve object overlap. Such operators are cost prohibitive and also limited in their capacity to keep up with multiple fast moving objects in real time. While, as Larson suggests, it is possible to use passive electronics to help identify objects once the system determines their identities have been lost, these devices will have their own resolution/speed of response restrictions which are cost sensitive.

6—Furthermore, both Larson and Abe's video/camera solutions anticipate the requirement of a human operator to initialize the system. Larson would require the operator to identify each object for the system. These objects would then be automatically tracked until they merged in some way with another object at which time the operator would be needed to re-initialize the tracking system. Abe would require the operator to crop the initial image down to a "region designating frame" which essentially reduces the processing requirements to at least find if not also track the object. The intervention of any operator is both cost prohibitive and real-time-response limiting.

7—Lowery's video/camera solution anticipates automatic tracking activation based upon the sound detected presence of an object within the field of view. This technique is inherently limited to objects that make distinguishing sounds. It is also unable to track multiple objects that might be making similar noises simultaneously within the given field of view.

8—If the tracking system attempts to eliminate image processing requirements by employing active electronic tracking devices such as Lemelson et al., then the objects are required to house powered devices capable of receiving and processing both locating and inquiry signals. Such devices limit the range and type of objects that can be tracked based upon the practicality and cost of embedding computing devices. In systems such as Lemelson's that employ electronics alone, the wealth of information available from image data is lost. Furthermore, such systems may be able to track location but cannot track object orientation, e.g. is the object traveling forwards or backwards.

9—With the exception of Hashima's indicia technique, all of these solutions are still not capturing object orientation information. Such information can be extremely important to anticipate future object movement.

10—All of the video/camera based solutions will have difficulty picking up fast moving objects whose color and or luminescence information is sufficiently close to that of other tracked objects or the image background no matter what technique is employed. All non-video based solutions will give up valuable image information.

While the present invention will be specified in reference to one particular example of multi-object tracking as will be described forthwith, this specification should not be construed as a limitation on the scope of the invention, but rather as an exemplification of preferred embodiments thereof. The inventors envision many related uses of the apparatus and methods herein disclosed only some of which will be mentioned in the conclusion to this applications specification. For purposes of teaching the novel aspects of this invention, the example of multi-object tracking is that of a sporting event such as hockey. The particular aspects of hockey which make it a difficult series of events to track and therefore a good example of the strengths of the present invention over the prior art are as follows:

1—There are no other human based activities know to the present inventors where the humans as objects can travel at a faster speed or change directions and orientation more quickly than hockey. On skates a player's speed can approach twenty-five miles per hour, which is considerably faster than any activity involving walking or running that is still conducted on the ground without the aid of a vehicle of some sort. Tracking these faster movements, especially given the variability of the human form, challenges the real time performance aspects of the system.

2—The speed of the object being contested by the players, i.e. the puck, can travel at rates of up to one hundred miles per hour and is also subject to sudden and quick changes of direction. This combination of speed and re-direction presents a difficult tracking problem and is unique in athletics. Tracking the puck is easier than tracking player when considering that the puck will not change shape yet the puck travels at roughly four times the speed, is on the magnitude of one hundred times as small and may travel in three dimensions.

3—The individual players are constantly entering and exiting the tracking field of view and as such must be efficiently and automatically identified by the tracking system in order for real time performance.

4—While in the field of view, both the puck and the players are routinely either fully or partially hidden from view as they merge with the paths of other players. This creates a challenge to follow movements with often limited or no image data.

5—The lighting conditions are difficult to work with since the ice surface will create a highly reflective background that could tend to saturate the CCD elements of the camera while the area itself may be subject to sudden bursts of light from either spectator's camera flashes or in-house lighting systems. This places limitations on luminescence based tracking techniques.

6—The colors of the players on the same team are identical and may often match the markings on the ice surface and surrounding rink boards. This places limitations on color based tracking techniques.

7—It is not unusual for a hockey game to be played while a certain level of fog exists within the arena. This challenges any camera-based system since it could greatly reduce visibility of the players and puck.

8—Hockey is a filmed event and as such it presents the opportunity not only to track the movement of multiple objects but also to determine a center of interest which is constantly and abruptly changing. Once this center is determined, there is a further advantage to automatically direct the tilt, pan and zoom of a broadcaster's camera to follow the action from a perspective view in real time. Automatically directing a camera that is situated for a perspective view presents a difficult problem for a machine vision system since it is considerably harder to follow the objects in three dimensions in real time as a perspective view would require.

9—Each individual player as well as the coaches in a game may at any time be instantly desirous of obtaining information regarding themselves, a group of players, their entire team and/or the other team. This information may furthermore pertain to the entire or some sub-set of the duration of the activities from start to present. Such requirements place a demand on the tracking system to quickly and efficiently store information in a way that it may easily be recalled from many viewpoints.

10—The enclosed metal and cement block arena precludes the use of GPS and presents difficulties for the use of passive electronic tracking devices due to the many potential reflections of in-house triangulation signals. The players themselves and the nature of the game and its potential for significant high impact collisions limit the desirability of placing active electronic devices within their equipment. Since these devices must carry a power source they will in practice take up enough space to present a potential hazard to the players. Furthermore, such devices would be extremely cost prohibitive at the local rink level where literally hundreds of children are playing games every week and would each need their own devices or to share devices.

11—Player orientation and location of limbs with respect to body are very important information to track. A player may be traveling forward facing forward while they are turning their head to the side to view the development of play. The turn of the head becomes important information for coaching analysis since it is an indication of a player's on-ice awareness. Furthermore, a play may almost instantly rotate their orientation while still proceeding in the same direction such that they are now traveling backwards instead of forwards. This is also very critical information. A player's head may be tilted down towards the ice, which is not desirable for prolonged periods of time or if often repeated. All of this information is important to track but presents problems over and above simply tracking the player as a whole.

12—Limiting the size of the area of tracking is desirable during practice sessions where individual drills may be conducted on a limited portion of the ice with a small number of players at a time. Under these conditions it would be desirable to easily restrict the system's tracking area within its field of view.

13—The number and speed of player changes and collisions is so great that utilizing human intervention to identify and re-identify players would be significantly stressful and error prone, if not practically impossible, especially at the local rink level.

Given the current state of the art in camera systems, non-visible energy sources and filters, digital image processing and automated camera controls it is possible to create an entirely automated multi-object tracking system which operates within a predefined area and tracks the constant location, orientation and direction of movement of each and every object within the field of view. Such a system greatly increases the ability of the participants and observers to understand, analyze and enjoy the given activity.

BACKGROUND OF THE CONTINUED EMBODIMENT

The current state of the art for transmitting live information concerning the movements of individual players and equipment within a sporting contest is a based upon traditional methods for filming the event followed by communication via either broad band, cable or direct satellite systems. Such techniques have two major problems. First, the various methods for filming the event limit the information gathered to the angles and perspectives chosen by the producers. Second, the data stream for these techniques is very large, whether it is stored in either an analog or digital format, although the digital formats can be compressed using standard compression algorithms. These two problems counteract each other in that any attempt to film sporting events from a multiplicity of viewpoints that could later be interactively selected by the end user in their remote location would linearly multiply the size of the data stream. This increased stream would subsequently exceed even the transmission capacities of cable and direct satellite. A third problem exists in that the information that is collected at the sports venue is not first analyzed and then transmitted with encoded markers and other information which can be employed by the remote receiving system to further enhance the viewing.

Given the state of the art in communications over the network of phone lines used by the World Wide Web (WWW) it is now possible to simultaneously transmit to a large number of connected remote sites a limited amount of information in real time. Further, given the state of the art in computer system processing speeds and computer generated animation, it is now becoming possible to generate "life-like" real-time images that may be interacted with by the end user. The present invention employs sophisticated tracking techniques such as previously described in the primary embodiment to translate and encode in real time all of the motions of a player and their equipment in a sporting contest. This encoded information requires much less bandwidth and could then be transmitted over a bandwidth limited communications channel such as the WWW and regenerated locally via graphics animation. Such a technique further allows the end user to dynamically alter and select their preferred viewing angle throughout the entire presentation. Such choices for viewing angle will also include the first person effect of experiencing the play from a specific player's perspective.

Employing the techniques taught in the primary embodiment, this continued embodiment specifically describes how the motions that are to be tracked by both the overhead X-Y tracking as well as the Z perspective cameras are to be translated into a streaming data set. It will be shown that this data set is compact enough to be transmitted over the smaller bandwidth phone lines in real time. It will be further shown that using this same data set the end user's computer system will be able to regenerate the pertinent player activity in a life like fashion in real time. During this continuous regeneration, the user will be able to constantly change and select new view angles to gain further clarity and enjoyment. Also, given the quantification of motion techniques employed by this continued embodiment, the translating end user computer system will also be able to create statistics regarding the players' motion which heretofore have been unavailable.

While the present invention will be specified in reference to one particular example of transmitting live action as will be described forthwith, this specification should not be construed as a limitation on the scope of the invention, but rather as an exemplification of the preferred embodiments thereof. The inventors envision many related uses of the apparatus and methods herein disclosed, only some of which will be mentioned in the conclusion to this application's specification. Given the current state of the art in internet connectivity, personal computer (PC) based graphics generation as well as the teachings of the primary embodiment that is the basis for this continued application, it is now possible to capture the movements of players, equipment and the game object in such a way that it may be compressed into a minimal data set of related points that may then be transmitted to a remote computer system and reassembled into a life-like representation of the captured event.

OBJECTS AND ADVANTAGES

Accordingly, the objects and advantages of the present invention are to provide a system for capturing and quantifying the stream of motion of a real-time event into a compressed data stream to multiple remote sites and then decompressing and reconstructing this same steam of motion in real time from any selected view point with the following capabilities:

- to provide a'system for capturing the three dimensional relative locations of selected points of interest on each participant, equipment and/or game object during the live event without human assistance;
- to provide a system for automatically translating these selected points of interest into a compressed data set;
- to provide a system for automatically and selectively transmitting this compressed data set in real time over the any bandwidth limited communications network, an example being the internet;
- to provide a system for automatically receiving and then selectively decompressing the transmitted data set into a life-like representation of the original event; and
- to provide a system whereby the end user can dynamically change their point of view to any fixed or moving position within the virtual event field-of-play and where all of the previously mentioned capabilities are conducted in real-time.

Further objects and advantages are to provide a cost efficient system to build, install and maintain with a minimum of moving parts that is capable of capturing events carried out in a wide range of weather conditions. Still further objects and advantages of the present invention will become apparent from a consideration of the drawings and ensuing description.

DESCRIPTION OF THE DRAWINGS

FIG. 3a is a perspective drawing of a typical hockey players pads, helmet, stick and puck being captured from an overhead X-Y filming camera and displayed on a viewing screen.

FIG. 3b is a perspective drawing similar to FIG. 3a except that now tracking ink has been added to the hockey stick and puck, tracking patches have been added to the pads and tracking stickers to the helmet. In addition, a tracking energy source as well as a frequency-matching filter has been added to the overhead X-Y filming camera making it a tracking camera.

FIG. 4a is a perspective drawing similar to FIG. 3b except that now an additional un-filtered filming camera has been added to the overhead X-Y tracking camera so as to efficiently combine both sets of information.

FIG. 4b is a top view depiction of a key element of the present invention's novel process for efficiently extracting the video image of the object being tracked by first locating an attached indicia and then working out away from the indicia comparing each pixel of the image to a pre-known background so as to effectively outline the tracked object.

FIG. 4c is a top view of a portion of an ice arena showing a series of tracked and traced motions of a typical hockey player, stick and puck by the overhead X-Y filming and tracking cameras depicted in FIG. 4a.

SPECIFICATION

Figure 1:
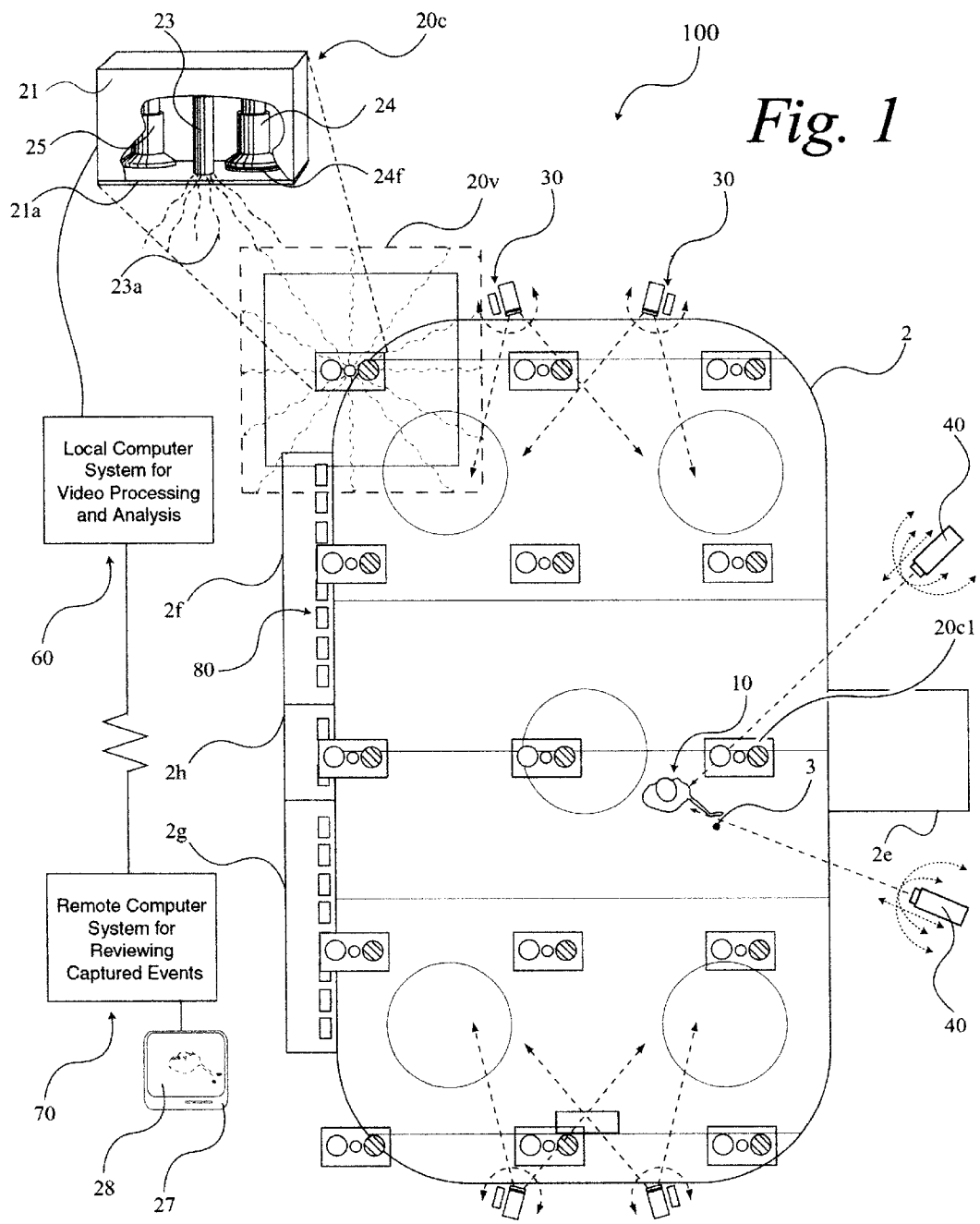
FIG. 1 is a top view drawing of the preferred embodiment of the present invention depicting an array of overhead X-Y tracking cameras which when taken together form a field of view encompassing the skating and bench area within an ice hockey arena. Also depicted are perspective Z tracking camera sets behind each goal, automatic pan, tilt and zoom perspective filming cameras as well as a single representative player and puck.

Referring to FIG. 1 there is shown a top view drawing of the preferred embodiment of the Multiple Object Tracking System 100. System 100 comprises an array of overhead x-y camera assemblies 20c that individually track all object movement within a fixed area such as 20v. In total, the array of overhead assemblies 20c track all movements in ice playing surface 2, team boxes 2f and 2g, penalty box 2h as well as a portion of entrance-way 2e. Assembly 20c further comprise filming camera 25, energy source 23, tracking camera 24 onto which is attached energy filter 24f, all of which is housed in assembly casing 21 and has a view to the ice surface 2 below through assembly Plexiglas 21a. Energy source 23 emits selected energy 23a which radiates down onto surface 2 and off of the objects moving upon this surface such as player 10 and puck 3. It should be noted that selected energy 23a was specifically chosen to be of a frequency that not only is outside of the range of normal ambient light but also will not be effected by moisture conditions such as fog. A specially situated overhead assembly 20c1 is shown as covering ice surface 2's entrance-way 2e. This assembly 20c1 is identical in construction to 20c and is important and will later be specifically referenced because all objects to be tracked must enter and exit through this camera's field of view. Also tracking movements on a selected portion of ice surface 2 are perspective z tracking camera sets 30 that are situated as one pair at both ends of the ice 2. And finally there are automatic filming cameras 40 which are constantly being directed to the center of play as represented by player 10 who is currently controlling puck 3. Automatic filming cameras 40 are in continuous communications with and are receiving their directions from local computer system for video processing and analysis 60. System 60 itself is also in continuous communications with array of overhead x-y tracking camera assemblies 20c and perspective z tracking camera sets 30. Local system 60 is in further in optional communication with remote computer system for reviewing captured events 70 which has attached viewing monitor 27 that displays scene 28. Also in optional communication with local system 60 are team output stations 80 which provide information on the object movements tracked from the beginning of the event to the current moment.

Figure 2A:
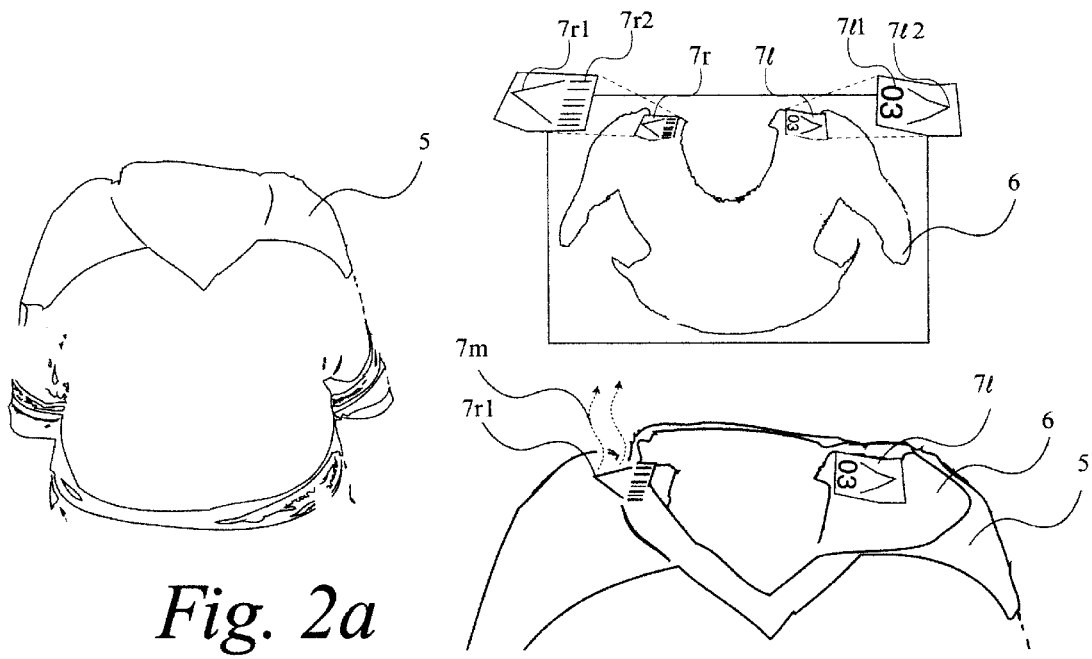
FIG. 2a is a set of three perspective drawings depicting a typical player's jersey, pads with tracking patches in place and then a combination of the jersey over the pad with patches.

Referring now to FIG. 2a there is depicted a typical player's jersey 5 and player's shoulder pads 6. Affixed to pads 6 are right shoulder team patch 7r and left shoulder player patch 7l. Patch 7r comprises orientation mark 7r1, which is an arrowhead pointing away from the head towards the arm and team indicia 7r2, which is a unique bar code. Patch 7l comprises orientation mark 7l1, which is also an arrowhead pointing away from the head towards the arm and player indicia 7l2, which is a unique number. It should be noted that the indicia on patches 7r and 7l are created from a frequency selective reflective material, preferably an ink. Also referring to FIG. 2a there is depicted jersey 5 placed over pads 6. Note that jersey 5 is also shown to be cut-away for a full view of underlying player patch 7l.

Also depicted in FIG. 2a is reflected energy 7m which is shown radiating though transmissive jersey 5. Such techniques for seeing through cloth are not new and were demonstrated by Sony Corporation when they placed a shirt over a license plate and then took two pictures, one without a filter and the other with a visible light filter. Since cloth reflects light in the visible spectrum so intensely, the plate could not be seen by the unfiltered image. But with the infrared pass filter only the infrared light was captured making the numbers and letters on the license plate visible. It should be noted that the present invention teaches the use of special frequency selective reflective material that will further enhance the contrast, i.e. signal to noise ratio, of the desired image above and beyond the filtering techniques discussed by Sony.

Figure 2B:
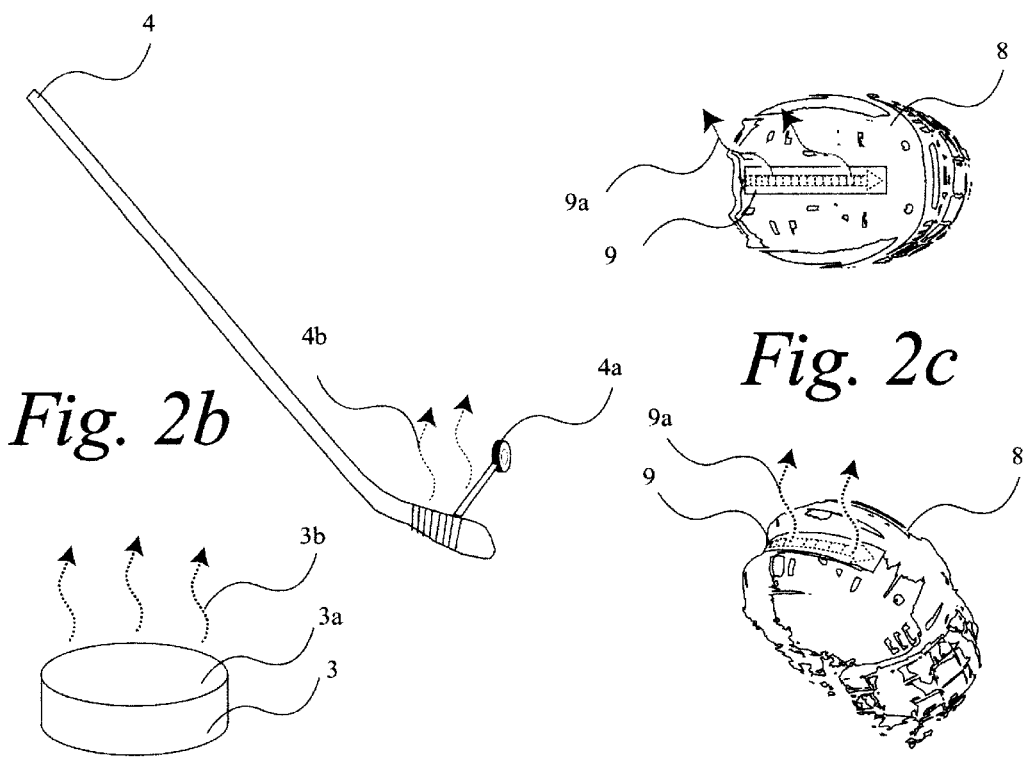
FIG. 2b is a set of two perspective drawings depicting a hockey puck as well as a typical player's hockey stick, where each has been augmented to include tracking ink on at least some portion of their outer surfaces.

Referring now to FIG. 2b there is shown a typical hockey puck 3 where its top surface (and in practice all outer surfaces) has been coated with a reflective ink 3a similar to the frequency selective reflective material used in patches 7r and 7*l*. In response to a particular frequency of energy as would be emitted for example by energy source 23, ink 3a causes reflected energy 3b. Also shown is a typical hockey stick 4 where its blade has been wrapped with a special reflective hockey tape 4a that has been produced to include the same special reflective ink. In response to a particular frequency of energy as would be emitted for example by energy source 23, reflective tape 4a causes reflected energy 4b.

Figure 2C:
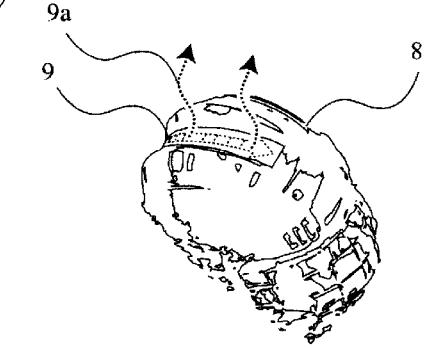
FIG. 2c is a set of two perspective drawings depicting a typical hockey players helmet which has been augmented to include tracking stickers on at least some top portion of its outer surface.

Referring now to FIG. 2c there is shown both a top and perspective view of a typical hockey players helmet 8 where a reflective sticker 9 has been applied to its top surface and has been produced to include the same special reflective ink. In response to a particular frequency of energy as would be emitted for example by energy source 23, sticker 9 causes reflected energy 9a.

Referring now to FIG. 3a there is shown a first embodiment of the overhead x-y tracking camera assembly 20a. In this embodiment, assembly 20a has been limited to tracking camera 24 (without energy filter 24f) which is enclosed within assembly casing 21 and has a view to the ice surface 2 below through assembly Plexiglas 21a. There is depicted below assembly 20a unmarked player 10, unmarked stick 4 and unmarked puck 3. Also show is cable 26 which attaches assembly 20a to local computer system 60 (not depicted), to remote computer 70 (also not depicted) and therefore to viewing monitor 27 that displays scene 28.

Referring now to FIG. 3b there is shown a second embodiment of the overhead x-y tracking camera assembly 20b. In this embodiment, assembly 20b has been augmented to include energy source 23 that emits selected energy 23a which radiates down onto the objects moving upon the ice surface such as player 10, puck 3 and stick 4. Note that player 10's pads 6 have been augmented to include right shoulder team patch 7r and left shoulder player patch 7l. Also note that Puck 3 now includes reflective ink 3a and that stick 4 has been wrapped with a special reflective hockey tape 4a. Scene 28 now depicts a much smaller set of information to be analyzed and tracked.

Figures 4A, 4B, 4C:
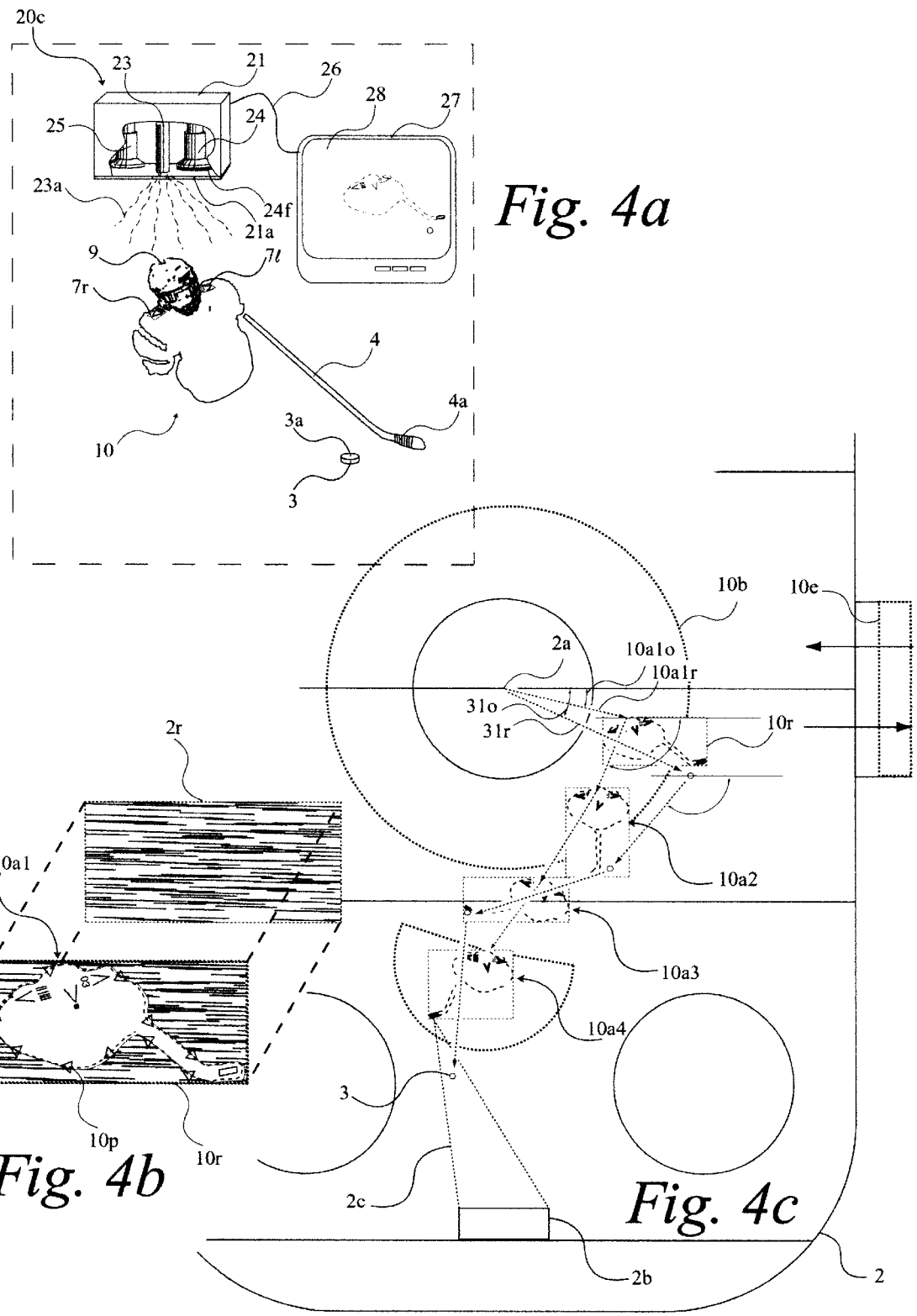

Referring now to FIG. 4a there is shown a third and the preferred embodiment of the overhead x-y tracking camera assembly 20c. In this embodiment, assembly 20c has been augmented to include filming camera 25 that captures unfiltered images of all movement on the ice surface below. FIG. 4b depicts a key element of the present invention's novel process for efficiently extracting the video image of the object being tracked by first locating an attached indicia and then working out away from the indicia comparing each pixel of the image to a pre-known background 2r. Once it is determined that background pixels have been reached, the image-tracing path 10p continues around the object until a closed path is completed. Around this closed path 10p a minimum bounding rectangle 10r is calculated in order to quickly extract the portion of the video image containing the tracked object. Referring also to FIG. 4c there is depicted the processed motion of player 10 upon ice surface 2 using the preferred assembly 20c. Player 10 is shown to transverse through four movements points 10a1, 10a2, 10a3 and 10a4 carrying puck 3 along the way towards taking a shot at goal 2b within calculated shot triangle 2c. The center of ice surface 2 is shown as point 2a from which first movement angle 10a1o and movement radius 10a1r have been calculated to represent player 10's first movement to point 10a1. Also calculated are movement angle 31o and movement radius 31r that describe puck 3's initial movement to point 10a1. About center point 2a there is shown a maximum bounding circle 10b within which an object's next location is calculated to be reside based upon the objects last known position (in this case point 2a) as well as its last calculated vectors of direction, acceleration and velocity. And finally there is depicted the maximum initialization search rectangle 10e which covers the outermost portion of the field of view as tracked by overhead assembly 20c1 which is situated over the only entrance-way 2e to ice surface 2.

Figure 5:
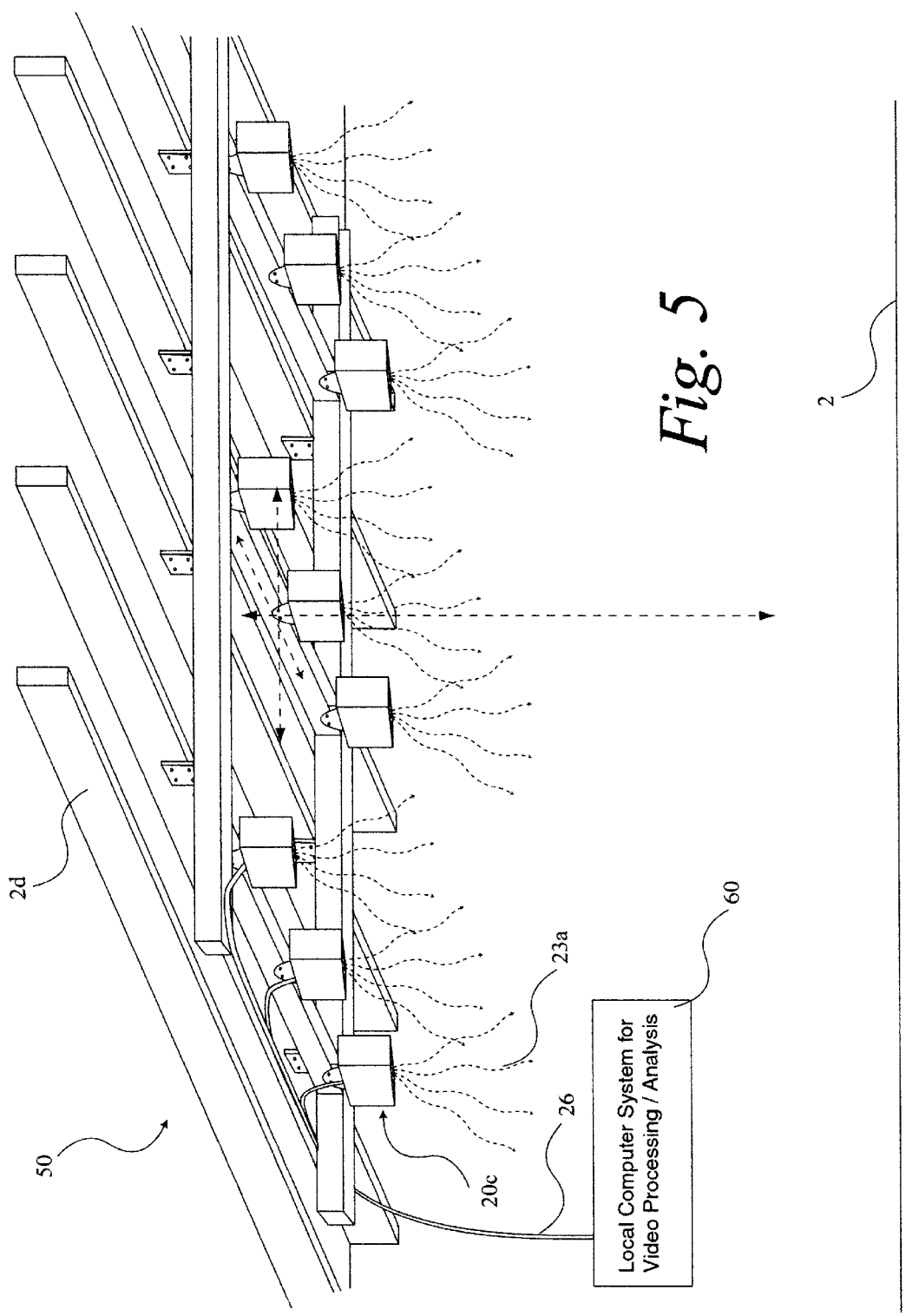
FIG. 5 is a perspective drawing of a mountable camera array frame with overhead X-Y filming and tracking cameras attached to the roof of a typical ice arena.

Referring now to FIG. 5 there is shown overhead mounting frame 50 that is variably attachable to differing constructions of rink girders 2d. Further attached to frame 50 is the array of overhead x-y tracking camera assemblies such as 23c that emit selected energy 23a down upon the ice surface 2 below. Assemblies 23c are connected to local computer system for video processing/analysis 60.

Figure 6:
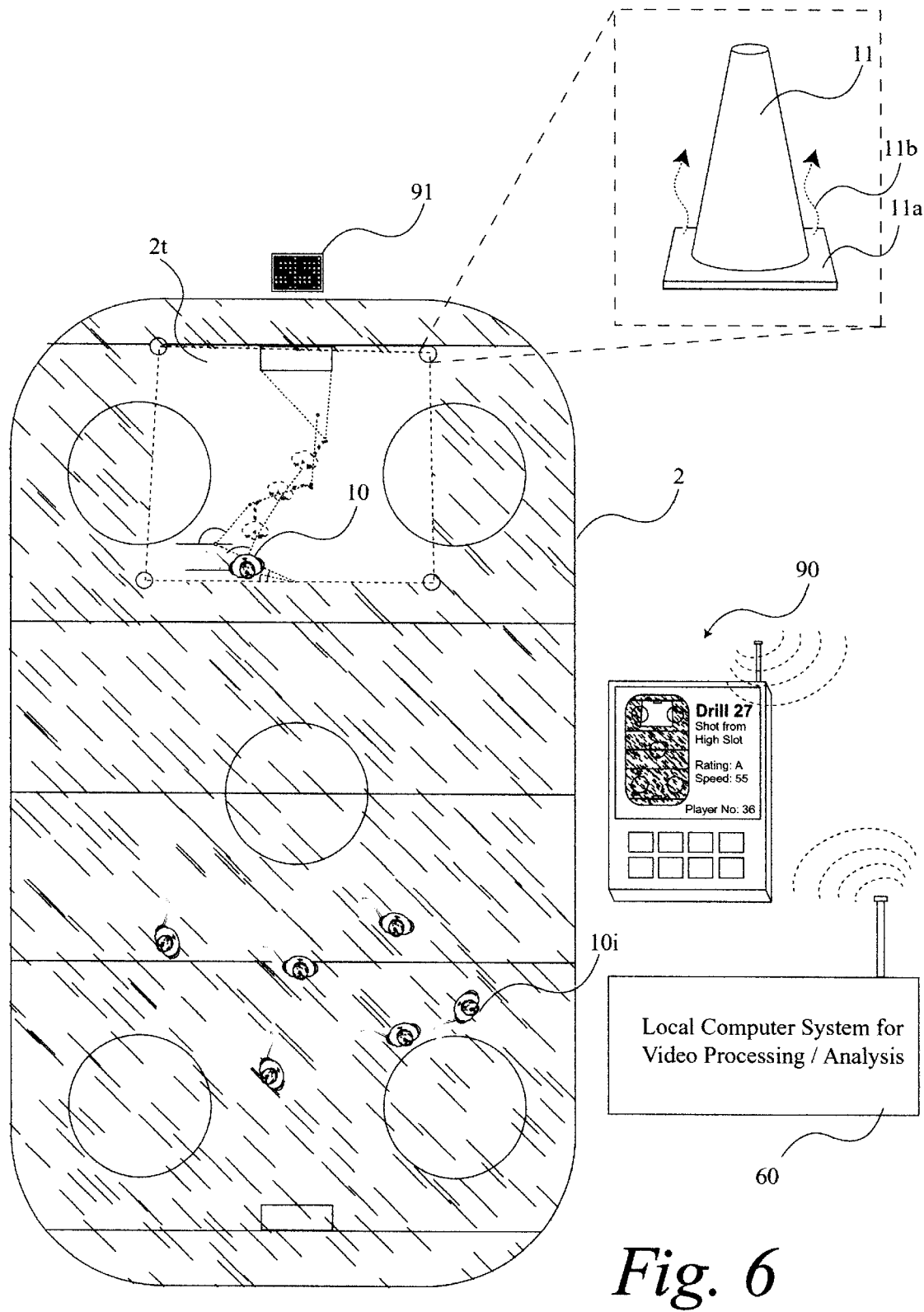
FIG. 6 is a top view drawing of an ice arena where area restricting cones with tracking ink have been placed so as to indicate to the overhead X-Y tracking cameras that only a sub-portion of the entire field of view is to be tracked. Also depicted are typical players, one is within the tracking zone while many are outside of the zone. Further depicted is a portable device that may be used by on ice coaching staff to control the functions of and inquire upon the information generated by the present invention.

Referring now to FIG. 6 there is depicted ice surface 2 whose tracking area has been restricted by the placement of four typical cones 11 which have been coated with a reflective ink 11a. In response to a particular frequency of energy as would be emitted for example by energy source 23, ink 11a causes reflected energy 11b. Shown within restricted region 2t is a single player 10 whose current motion is to be tracked while he remains within region 2t. Shown outside of region 2t are multiple players such as 10i whose movements are not being tracked. Also shown are shot clock 91 and portable tracking control device 90 that are both in optional communication with local computer system 60.

Figure 7:
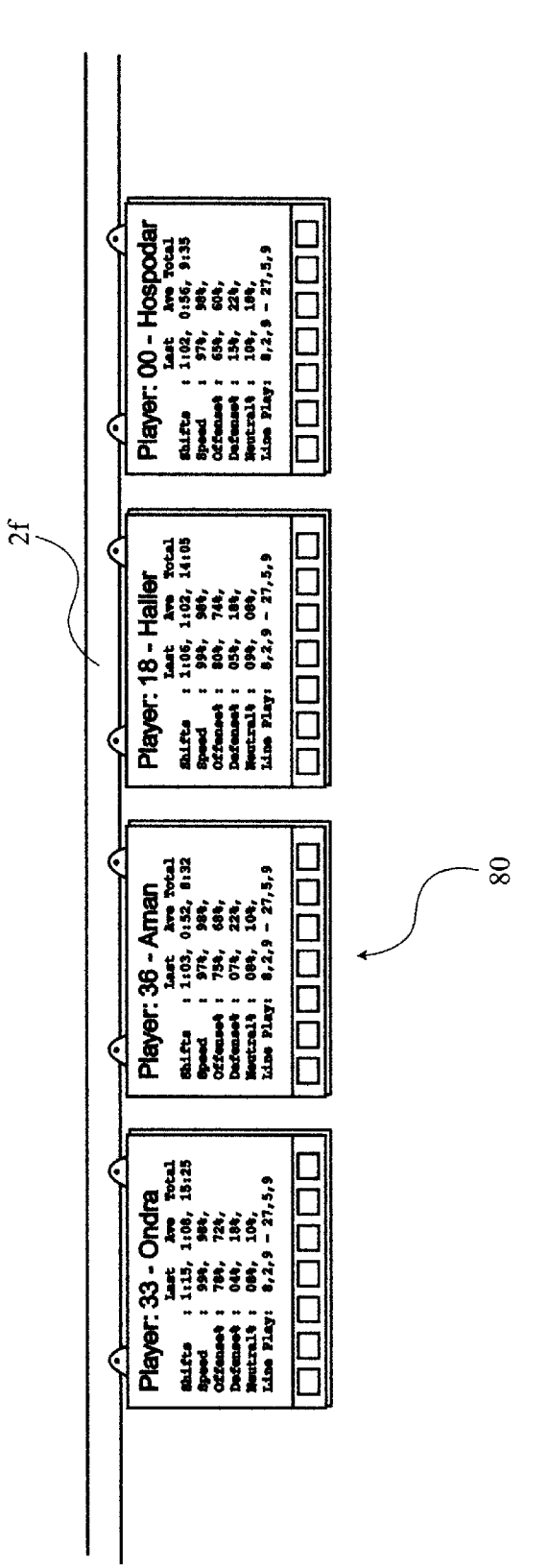
FIG. 7 is a front view drawing of a hockey players bench which has been outfitted with a series of display devices with keypads that may be used by typical hockey players during the course of a hockey game to inquire upon the information generated by the tracking system.

Referring now to FIG. 7 there is shown a close up view of team output stations 80 that are attached to team boxes 2f (shown) and 2g, as well as penalty box 2h.

Figure 8:
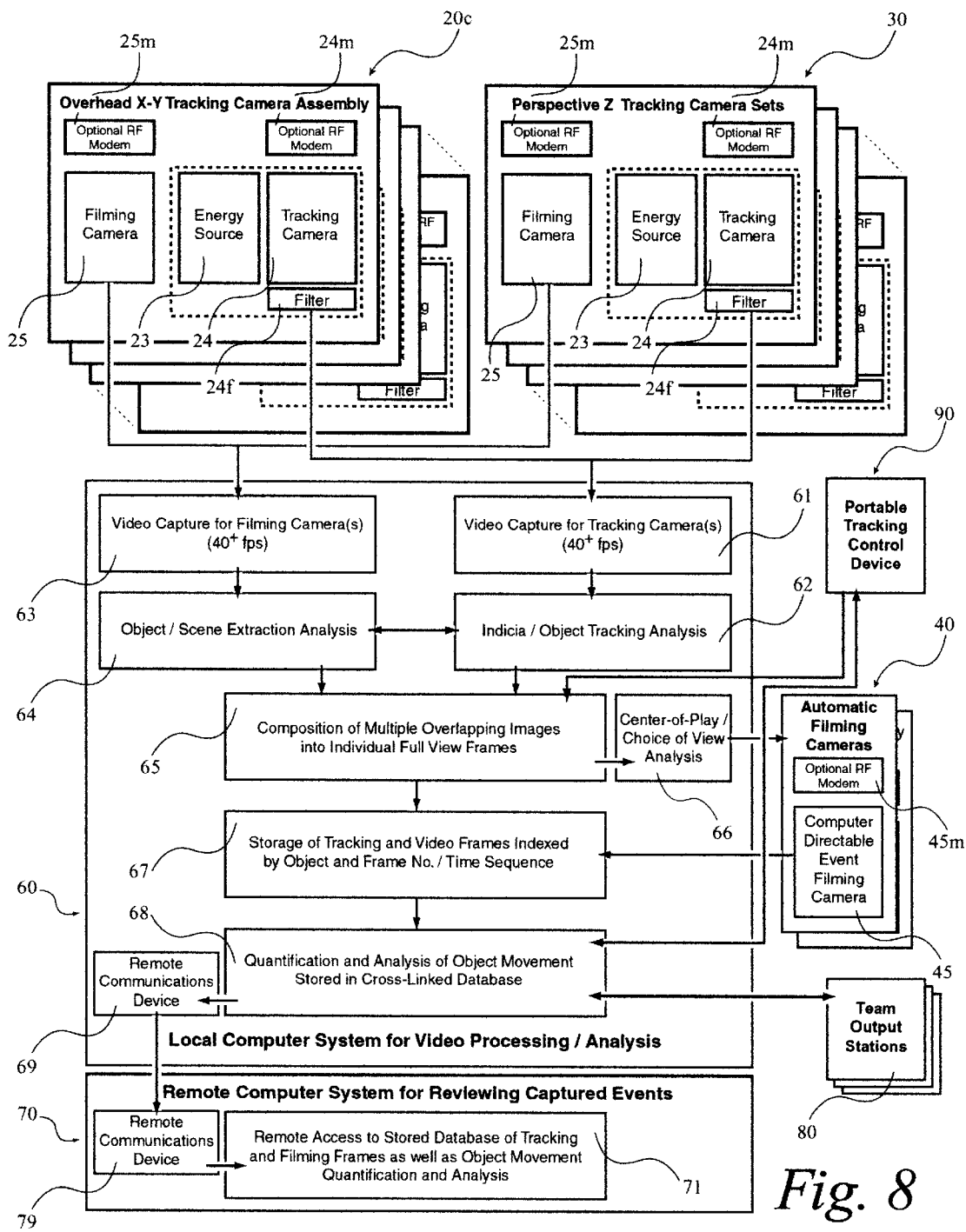
FIG. 8 is a block diagram depicting all of the tracking and computing elements of the proposed present invention.

Referring now to FIG. 8 there is depicted a block diagram of the entire system. With respect to overhead x-y tracking camera assembly 30c there is shown additional optional rf modem 25m which may be used in place of wire 26 (not depicted) to link filming camera 25 to local computer system 60. Also shown is additional optional RF modem 24m which may be used in place of wire 26 (not depicted) to link tracking camera 24 to local computer system 60. Likewise additions are also depicted for perspective z tracking camera sets 30. Local system 60 has been broken down into its constituent block parts starting with the video capture for tracking camera(s) unit 61 which accepts input from all tracking camera(s) 24 mounted within overhead assemblies 30c or perspective sets 30. Capture unit 61 then feeds its data stream to indicia/object tracking analysis unit 62. In time parallel operation there is shown video capture for filming camera(s) unit 63 which accepts input from all filming camera(s) 25 mounted within overhead assemblies 30c or perspective sets 30. Capture unit 63 then feeds its data stream to object/scene extraction analysis unit 64. Unit 64 also receives simultaneous input from indicia/object tracking analysis unit 62. Both extraction analysis unit 64 and tracking analysis unit 62 simultaneously provide their data streams to composition of multiple overlapping images into individual full view frames unit 65. Unit 65 also receives conditional input from portable tracking control device 90 and provides its data stream to both center-of-play/choice of view analysis unit 66 and storage of tracking and video frames indexed by object and frame no./time sequence unit 67. Choice of view analysis unit 66 in turn provides real time directives to automatic filming cameras 40 through conventional wire or optional RF modem 45m. Such directives are then input to computer directable event filming camera 45. Filming camera 45 then feeds its data stream back to storage and tracking unit 67 via conventional wire or optional RF modem. Unit 67 subsequently provides its data stream to quantification and analysis of object movement stored in cross-linked database unit 68. Unit 68 optionally conducts two-way communications with portable tracking control device 90, team output stations 80 and remote computer system for reviewing captured events 70. The optional link with device 90 will be made via Rf connection (not depicted) while the link with remote system 70 will be made via remote communications devices 69 and 79. The information provided by local system 60 to remote system 70 will be provided to the end user via remote access to stored database of tracking and filming frames as well as object movement quantification and analysis unit 71.

Figure 9A:
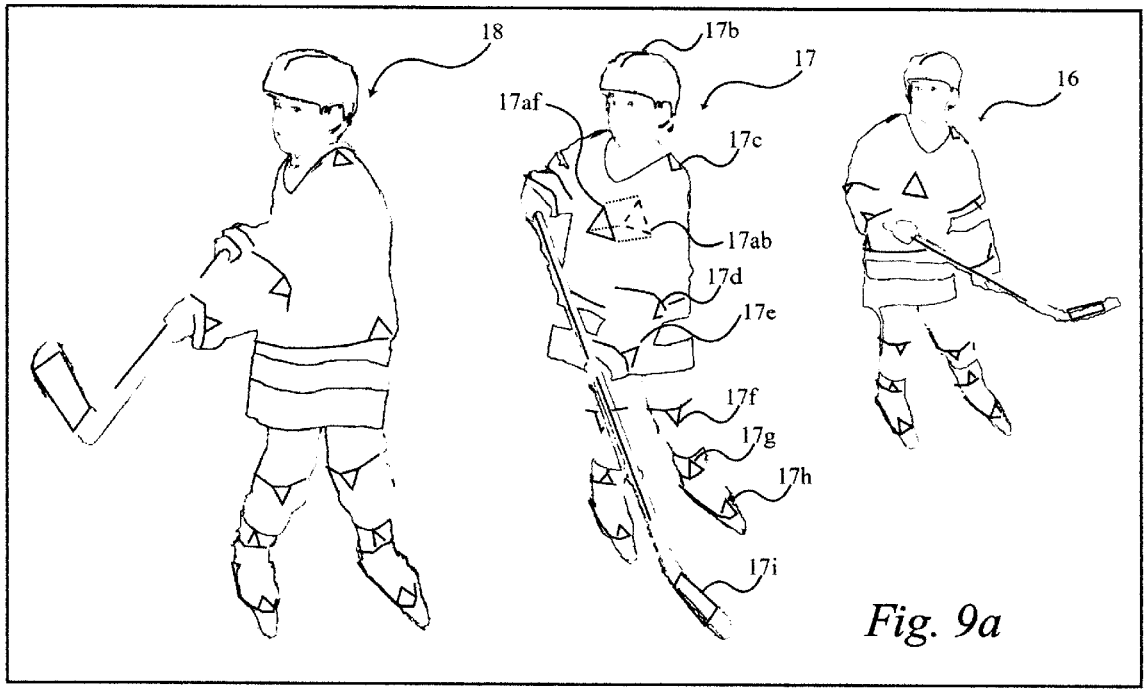
FIG. 9a is a series of three perspective drawings of a roller hockey player who has been marked at selected points with special reflective ink.

Referring to FIG. 9a there is shown three consecutive drawings 16, 17 and 18 of a roller hockey player in motion. The roller hockey player 17 and his equipment have been selectively marked with patches or ink such as 17af, 17ab, 17b, 17c, 17d, 17e, 17f, 17g, 17h, and 17i. It should be noted that the patches or ink are created from a frequency selective material as previously described in the primary embodiment to which this specification is a continuation.

Figure 9B:
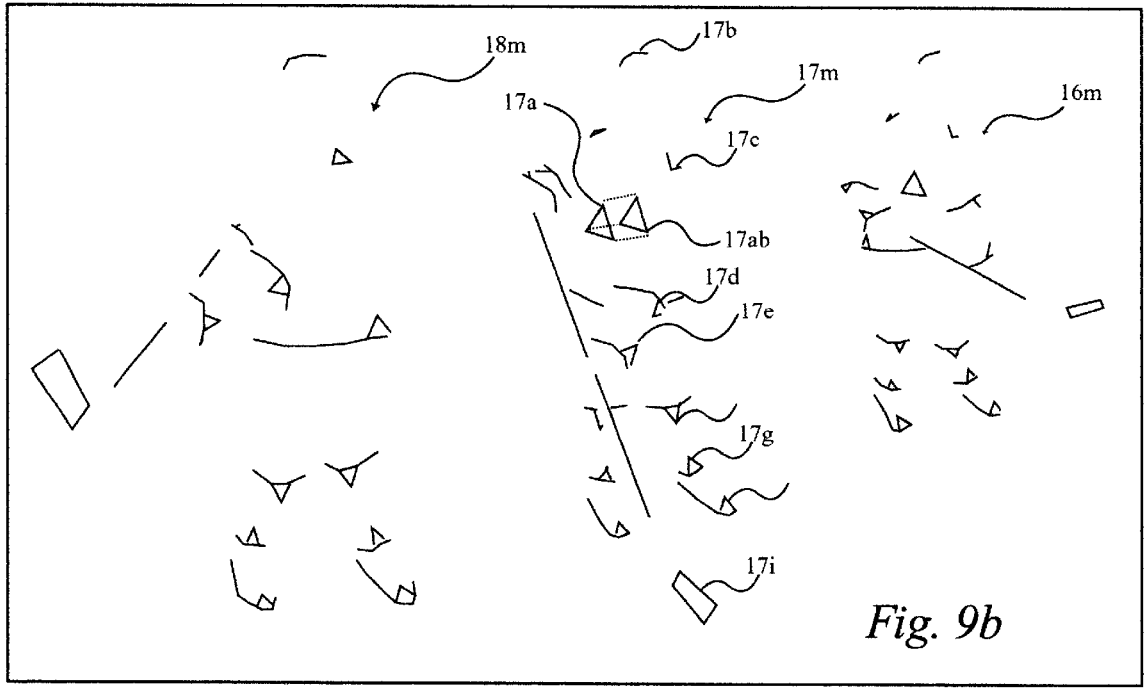
FIG. 9b is the same series of three perspective drawings as in 9a but now showing only the special markings that represent the movement of the hockey player.

Referring to FIG. 9b there is shown three consecutive drawings 16m, 17m and 18m of the same roller hockey player as depicted in FIG. 9a 16,17 and 18 where only the selective marks such as 17af through 17i have been depicted. Note that selective mark 17ab as depicted represents a marking on the back of player 17 which is exactly parallel to marking 17af that is on the front of player 17.

Figure 10B:
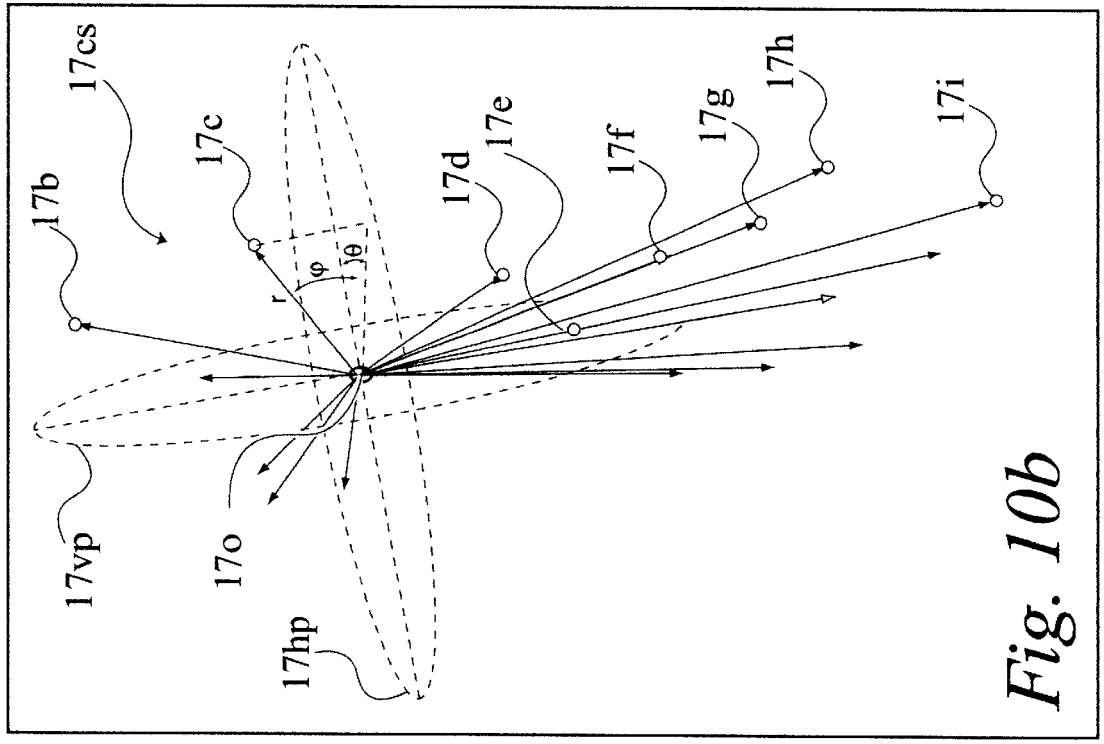
FIG. 10b is a repeated drawing of FIG. 10a with the selected markings removed leaving only the three-dimensional player coordinate system mapping of the locations of the marked points.
Figure 10A:
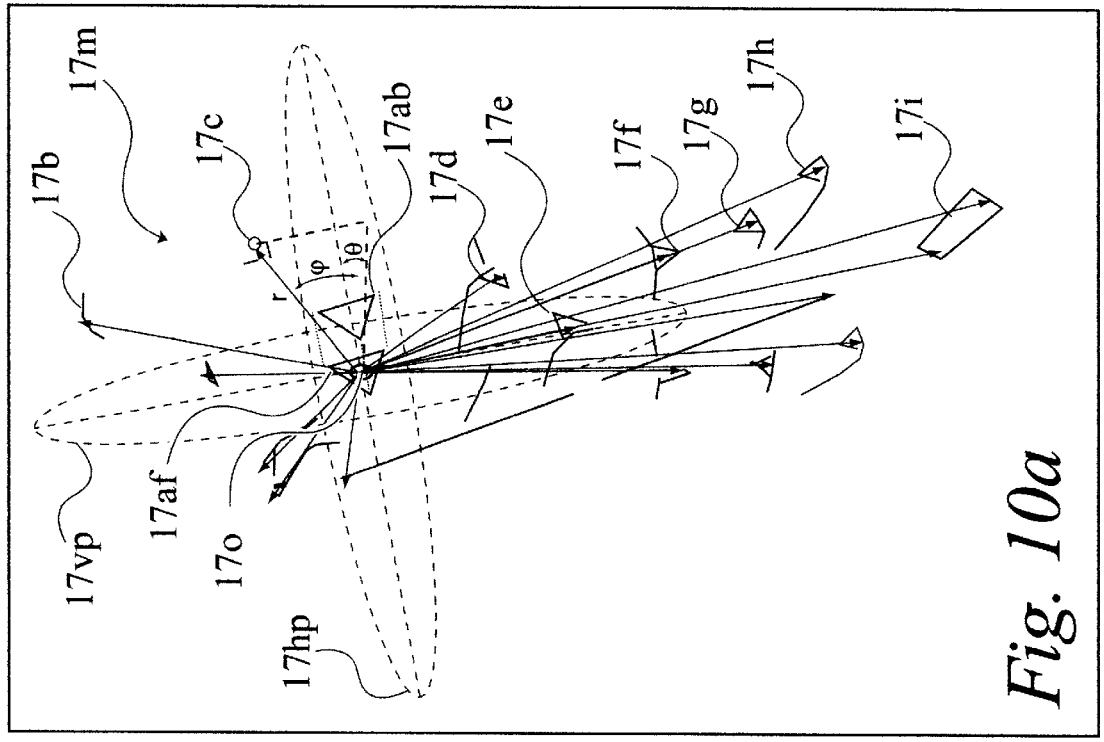
FIG. 10a is a repeated drawing of the middle of the three drawings in FIG. 9b that has been overlaid with a three-dimensional player coordinate system mapping the locations of the marked points with respect to the designated player origin.

Referring to FIG. 10a there is shown only the selectively marked patches or ink 17af through 17i which when taken together form marker group 17m that has been overlaid with a three-dimensional player coordinate system 17cs (not labeled until FIG. 10b). This system is based upon a designated origin such as 17o for which all other points such as 17c are related via a conventional 3-D spherical coordinate system having the angle of rotation (θ), the azimuth angle (φ) and the distance (r) from the origin 17o to the selected point such as 17c. Note that markings 17af and 17ab together define the designated origin 17o of the player coordinate system 17cs along with the orientations of the horizontal plane 17hp and vertical plane 17vp.

Referring to FIG. 10b there is shown the resulting marker group coordinates 17cs without player 17 or marker group 17m.

OPERATION

Referring first to FIGS. 1 and 5, normal operation of the preferred embodiment commences after the system 100 has been properly installed at an ice arena such as 2. One of the more critical aspects of installation is the attachment of the array of overhead x-y tracking camera assemblies 30c to the roof of arena 2. Mounting frame 50 has been designed to variably attach to rink girders 2d in such as way that the subsequently attached array of overhead assemblies 30c forms an overlapping field of view across of the ice surface 2 below. It is preferable that each assembly 30c maintains a perpendicular position with respect to surface 2. It is anticipated that either fixed lenses with pre-selected depths of field or electronically controllable zoomable lenses will be used to properly establish the overlapping fields. The overlap is important to ensure that any object to be tracked can be followed from camera to camera as it moves throughout the predefined area. As a part of the initial installation and setup of system 100, a calibration procedure will be run to define the limits of each filming cameras' 25 and tracking cameras' 24 field of view. Once known, the system will restrict its searching to non-overlapping regions in order to minimize duplicate processing. All assemblies 30c will either communicate with local system 60 via cables such as 26 or optional RF modems such as 25m and 24m.

Referring now to FIGS. 2a, 2b and 2c, the preferred embodiment provides for various methods of marking the objects to be tracked with a specially chosen frequency selective reflective material such as an ink. This ink is then used to embed into puck 3 as reflective ink 3a, to produce reflective tape 4a, to embed into markings of patches 7r and 7l, and to produce reflective stickers 9 for helmets 8. It is also used to create cones 11 with reflective ink 11 a as shown in FIG. 6. It is critical to the novelty of the present invention to note that this ink has been chosen specifically to reflect energy 23a as output by energy source 23. This reflection has been depicted as 3b, 4b, 7m, 9a and 11b and will be received by tracking cameras 24 through energy filter 24f. By using specially matched energy filter 24f on each camera 24, the amount of information required to be processed in order to follow all object motion is minimized thus greatly increasing the speed of determining the object's position.

To further illustrate the novelty of this point, FIGS. 3a, 3b and 4a have been created to dramatize the resultant effects of the addition of this tracking ink. FIG. 3a shows a conventional camera system capturing ambient light and showing its corresponding field of view as scene 28 on monitor 27. Note that in this view there is considerably more information that must be processed including the object such as player 10 and the background such as ice surface 2. By adding reflective materials as previously discussed in the form of 3a, 4a, 7r, 7l and 9, FIG. 3b now shows a much reduced amount of information in scene 28. Again, this is accomplished in real time without the requirements for additional computer processing by the application of energy filter 24f to tracking camera 24 which was specially chosen to pass a narrow band of frequency as emitted by energy source 23 as selected energy 23a. Energy 23a radiates throughout the predefined area such as ice surface 2 and is reflected back as 3b, 4b, 7m and 9a. Orientation marks 7r1 and 7l1, team indicia 7r2, player indicia 7l2 as well as reflective sticker 9 have been produced to include special markings which will be easily discernable to indicia/object tracking analysis unit 62. The size of these markings will be matched to the target resolution of tracking cameras 24 in overhead assemblies 30c. Hence, the lower the resolution vs. field of view, the larger the marking will have to be to facilitate easy recognition. The preferred embodiment also includes unfiltered filming cameras 25 that will capture all ambient frequencies of light, as depicted in FIG. 4a. However, as will be discussed at a later point, due to information provided by the tracking analysis, only a small portion of this data must be gone through in order to extract all relevant object information.

Prior to running system 100 it will also be necessary to install perspective z tracking camera sets 30. One set will be mounted at each end of ice surface 2 so as to be in constant view of the area immediately surrounding each goal 2b. These sets 30 are so placed in anticipation of the travel path of puck 3 which is expected to leave surface 2 and to travel in the Z direction when approaching goals 2b. Note that due to the overhead nature of assemblies 30c, they will be unable to pick up any object movement in the Z dimensions which is acceptable and even desirable since it reduces the amount of processing that must be performed to track all objects. However, in the restricted area nearest to goals 2b, namely defined by triangular area 2c, it can be very beneficial to track the Z element of puck 3's path of travel. It is important to note that sets 30 and the information they collect are not required to allow the main aspect of what the present inventors feel is novel concerning this invention. Specifically, the practice of following movements of specially marked objects and to apply this information to normal video images to quickly extract object information.

Also optional and yet novel to the present invention is the inclusion of automatic filming cameras 40 at discretionary locations within ice surface arena 2. Heretofore, camera operators who intuitively determined the center-of-play controlled the filming for broadcast of events such as hockey and self directed the pan, zoom and tilt of their filming cameras to capture the restricted scene. Now that system 100 will have all information concerning the movement of objects on the ice surface 2, it is planned that local computer system 60, via its center-of-play/choice of view analysis unit 66, will automatically direct the pan, zoom and tilt of the automatic filming cameras 40.

Once all overhead x-y tracking camera assemblies 30c, all perspective z tracking camera sets 30 and all automatic filming cameras 40 have been correctly installed and calibrated and all objects to be tracked have been appropriately augmented with marks such as 3a, 4a, 7r, 7l and 9, system 100 is ready for operation. The ensuing discussion will describe how the movements of a single player 10, stick 4 and puck 3 will be tracked from frame to frame during the duration of the event across the entire predefined field of view in the X-Y and Z dimensions. Following this, the present inventors will teach how additional players 10 with their sticks 4 may also be simultaneously tracked and how problems due to object overlap, object change in size, object disappearance from view, sudden changes in ambient lighting and otherwise reductions in visibility for example because of fog will be handled.

Referring now to FIGS. 1, 2, 4a, 4b, and 8, the tracking of multiple objects by system 100 commences after the system has been turned on and the first player 10 proceeds down entrance-way 2e and crosses into the field of view of the array of overhead assemblies 30c. Within entrance-way 2e player 10 will first appear in a single frame captured by video capture for tracking camera(s) unit 61. Unit 61 will in total capture 40 plus frames per second (40+ fps) from each tracking camera in assembly 20c and will feed each frame to indicia/object tracking analysis unit 62.

Note that given the current state of technology one camera controller board such as would be required within unit 61 can control up to eight cameras. The actual number of frames per second that needs to be captured is dependent upon the desired movement resolution. For instance, the fastest object in our example is the puck 3 that will at times travel up to 100 mph. At 40 frames per second, 5280 feet per mile and 60*60=3,600 seconds per hour the maximum distance of travel for the puck 3 per second is: (100 miles/hour*5280 feet/mile)/(3,600 sec/hour)=146.7 feet. At a rate of 40 frames per second, the maximum distance traveled between frames would be 3.7 feet. Note that a player such as 10 on skates will obtain maximum speeds of around 25 mph, or one quarter of the speed of the puck. At 40 frames per second, the maximum distance traveled by a player 10 would be approximately 0.925 feet. At 20 frames a second, the puck 3 will travel no more than 8 feet at maximum speed while the player 10 will be limited to approximately 2 feet in distance. Considering that both player 10 and puck 3 seldom travel at maximum speed, movement resolution will be considerably higher in practice. Further note that there is an anticipated area, namely around goal 2b where puck 3 is most likely to reach top speeds. Both the overhead camera assemblies 20c and the perspective camera sets 30 can be operated at an increased frame capture rate to increase movement resolution in these specific zones. In any case, the present invention has the ability to trade off cost of computing power versus movement resolution by trading off the frame rate and the number of tracking cameras 24 that will be attached to a single computer and video capture card. It should be recognized that the use of multiple computers to gather and analyze data is considered to be neither novel to, nor a limitation of, the present invention.

As each frame from tracking camera 24 of overhead assembly 20c1 is accepted by analysis unit 62, the grey scale of each pixel is compared against a threshold value where those pixels exceeding the threshold indicate the presence of any form of the special mark such as 3a, 4a, 7r, 7l and 9. Since every player 10 must both enter and leave the ice surface 2 from entrance-way 2e which is always in view by assembly 20c1, and since the maximum movement between frames can be calculated based upon the anticipated maximum speed and the frame capture rate, it is possible to calculate a minimum number of pixels that must be completely searched in order to first detect the presence of a new player such as 10. This minimum number of pixels is shown as 10e in FIG. 4c and consists of those pixels running parallel along the outermost edge of assembly 20c1's field of view inward several rows toward the main ice surface 2. The depth of this rectangular area will again depend upon the maximum distance a player 10 can be expected to travel between frame captures. Note that even in other sporting events such as basketball or football, there is usually a tunnel through which each team must travel to gain access to the main arena. If the systems field of view is properly extended to be continuous into any such tunnel, then this minimum search technique may be employed to first detect any new player to be tracked. As will be shown, once detected, the processing requirements of continuing to track are significantly reduced since the extent of a player's movement between frames is limited.

Referring now additionally to FIG. 4c, once a marked object is detected, whether it be a patch 7r or 7l on pads 6, or the reflective sticker 9 on helmet 8, or the reflective ink 3a on puck 3, or the reflective hockey tape 4a wrapped around a stick blade 4, it is tracked individually. The first detected movement of each mark is expressed in polar coordinates relative to the center point 2a of ice surface 2. Hence each object's first movement is expressed as an angle off 0° and a distance from center point 2a along the stated angle, these calculations are performed constantly by object tracking analysis unit 62. Once unit 62 has detected a given object, it will continue to look for that object within its field of view based upon the last known coordinates, the last know vectors of direction, acceleration and velocity and the calculated maximum distance of travel between frames. The last known coordinates combined with the maximum possible travel distance will work to define a maximum bounding circle, depicted as 10b in FIG. 4c, of possible movement which must be searched in order to find the objects next location. In order to cut the average search time within this bounding circle, unit 62 will first look in the last known direction of travel based upon prior movements out a distance equal to the last know rate of speed divided by the known frame rate. From this new most likely point within the bounding circle, unit 62 will continue to search by growing this point in all directions until the entire bounding circle has been analyzed. In the event that the marking is not found and it is known that the object has entirely passed through the minimum rectangle of pixels bordering the edge of the field-of-view covering the entrance-way 2e, then the object will be searched for on the next frame. In this case the new maximum bounding circle's radius will be twice that of the previous search.

If a marked object is detected and then is lost to system 100, tracking analysis unit 62 will first communicate with object/scene extraction analysis unit 64 to determine if the presence of additional ambient light based information will uncover the objects location. Before reviewing this technique, it should first be noted that once a marked object is detected, its type and location are passed to extraction unit 64 from tracking unit 63, extraction unit 64 then analyses the corresponding unfiltered video frame taken by the filming camera 25 that is housed in the same overhead assembly 20*c* whose tracking camera 24 is currently viewing the located object. Knowing the type of object, for example a patch 7*r* or reflective sticker 9, indicates to extraction unit 64 the maximum expected size of the actual object, for example pads 6 or helmet 8. Given this maximum size along with the current location of the reflective indicia, unit 64 will begin at the location of the attached indicia and then work its way out away from the indicia comparing each pixel of the image to a pre-known background 2*r*, as depicted in FIG. 4*b*. Once it is determined that background pixels have been reached, the image-tracing path 10*p* continues around the object until a closed path is completed. Around this closed path 10*p* a minimum bounding rectangle 10*r* is calculated in order to quickly extract the portion of the video image containing the tracked object. By knowing the expected maximum size of the object associated with the type of indicia found object (e.g. pad 6 or helmet 8 or player 10), this process can be restricted to a maximum bounding circle in order to find the edge of the object. Note that this object defined by closed path 10*p* may and often will contain two or more indicia such as patches 7*r* and 7*l* as well as sticker 9. This extracted surface as defined by 10*r*, as well as the tracked location of each reflective object within that surface is then passed to composition of multiple overlapping images into individual full view frames unit 65. Unit 65 then catalogues into one complete set all detected reflective objects such as 3*b*, 4*b*, 7*m* and 9*a* and their corresponding extracted object pixels that have been detected over the entire field of view. As a matter of practice, the extracted pixels will be expressed as the minimum-bounding rectangle as depicted by 10*r* rather than a list of pixel coordinates. Within this minimum bounding rectangle, all background pixels will have been set to a null value by extraction unit 64 to clearly differentiate them from the foreground object during later examination. A center of gravity as well as polar coordinates to that center point are also calculated by Extraction Unit 64 and passed to composition unit 65. And finally unit 64 will determine a beginning edge point to be associated with each object that can be used by later routines to quickly trace the outline of the object from within its minimum bounding rectangle to perform a final extraction. It is also the responsibility of composition unit 65 to piece together reflective surfaces such as 3*b*, 4*b*, 7*m* and 9*a* as well as the objects to which they are attached such as pads 6 or helmet 8 or player 10 which may overlap frames taken by separate filming 25 or tracking cameras 24.

Once the composition unit 65 has created the known set of polar coordinates to the centers of gravity for all know reflective markings and their corresponding objects and has also defined the minimum bounding rectangles and a beginning edge point this entire set of data is passed to the storage of tracking and video frames indexed by object and frame no./time sequence unit 67. As the entire set of frames across the field of view created by the array of overhead assemblies 20*c* and perspective sets 30 are continually input by capture units 61 they will be passed to tracking unit 62 which will follow each new object as it enters the field of view 20*c*1 and ultimately leaves via the same assembly 20*c*1. The present inventors anticipate that after identifying the first appearance of an inked surface or corresponding object it may be more efficient to allow tracking unit 62 to express subsequent centers of gravity using the same polar coordinate method except that the center point is no longer the center of Ice 2*a* but rather the previous center of gravity for the same inked surface or corresponding object. This changing center of reference strategy is shown in FIG. 4*c* by the sequence 10*a*1 through 10*a*4.

Storage unit 67 will take in this continual flow of inked surface and corresponding object information and will create several databases for later analysis. First, each individual surface and object will have its own movements catalogued from the point it enters the field of view until at some later point it leaves. Note that the field of view is extended to cover team boxes 2*f* and 2*g* as well as the penalty box 2*h*. Hence, to system 100, there is no difference to tracking these surfaces and objects in these areas, where they are not active in the current event, as opposed to on the ice surface 2, where they are active, storage unit 67 is also responsible for creating and storing group information. For instance, unit 67 is expecting to find the following associations:

1. It will always true that a player 10 will have an associated right patch 7*r* and left patch 7*l*.
2. It will most often be true that a player 10 will also have an associated helmet 8 with sticker 9 and a stick 4 with tape 4*a*.
3. It will sometimes be true that a player 10 will have puck 3 within its direct semi-circle of control. This semi-circle will be defined by the player 10's current location, direction, speed of travel and orientation and is depicted as 10*s* in FIG. 4*c*.
4. It will sometimes be true that a player 10 may appear to have additional patches, helmets or sticks in which case multiple players may have collided.

Whatever associations are detected are used to form a players group database. Note that storage unit 67 will distinguish between a stray stick or helmet and a player. As such, the stray stick or helmet will not create another instance of a player group. Hence, frame by frame a count will be made of to total number of unique player groups which should stay equal unless:

1. A new player enters the field of view.
2. An existing player exists the field of view.
3. There is a collision between one or more players such that their forms are temporarily joined.

When two or more player groups are joined to form a single group somewhere within the field of view, it is anticipated that eventually the players will separate. At this point the system which had assigned the groups movements to each know player who had entered the group, will now begin to track individual players and the total group count will have returned to its pre-collision count.

As storage unit 67 continually updates its various databases, this same information then becomes available in real time to quantification and analysis of object movement stored in cross-linked database unit 68. Quantification and analysis unit 68 will have a variable set of tasks it can perform on the tracking databases which can be enabled as either real-time or post event. In either case, some of those tasks are listed as follows:

1. Correlate individual player group data to a pre-known list of potential players. This is accomplished by comparing the team indicia 7r2 as well as the player indicia 7l2 to a pre-known database of values.

2. Determine player orientation based upon the location of inked surfaces within the extracted objects in combination with the last known direction, speed and orientation of both the inked surfaces and their associated objects.

Hence unit 68 will be able to identify that a player is skating backward versus forwards, or that their head and shoulders are beginning to turn and therefore it is expected that so will their direction of travel in the next captured frame. It should be further noted that reflective sticker 9 was specifically designed to also assist unit 68 in determining whether the associated helmet 8 (and therefore players head) is looking down or straight ahead. This is facilitated by the alternating black and white squares of sticker 9 that will vary in count depending upon helmet 8's orientation.

3. Update player statistics such as time entered and left ice surface (known as a shift), duration of shift, average speed, percentage of shift spent in defensive, neutral or offensive zones, percentage of puck control, number of shots, turnovers, steels, passes, etc.

4. Update team statistics such as number of shifts, average duration of shifts, percentage of play in defensive, neutral and offensive zones, percentage of puck control, number of shots, turnovers, steels, passes, etc.

Any and all of this information that was pre-enabled to be tracked in real time is now available for inquiry and display on team output stations 80. After the event has completed, or during scheduled breaks in event activity, quantification and analysis unit 68 may continue to process the stored databases in order to derive additional information which was not pre-enabled for real time. Other events, whether they are sporting or not and irrespective of the inclusion of human objects, will have their own set of uniquely desirable quantification and analysis requirements.

At any time after the completion of the event and all of its analysis by unit 68, it may be desirable for selected individuals to remotely inquire upon the information tracked and analyzed by local computer system 60. Via the use of conventional remote communications devices depicted as 69 and 79 in FIG. 8, a remote computer system for reviewing captured events depicted as 70 may be used to access the event databases. The present inventors do consider that the disclosed technique of first tracking specially inked surfaces which have been attached to objects which are desired to track and then extracting the minimum bounding areas of those objects movements is novel for at least the following reasons:

1. The technique operates in a minimum of time and requires a minimum of computer processing by using a selected and narrow band of energy to illuminate and capture a small amount of information which yields object identity, orientation, direction of travel and speed at a minimum, irrespective of the ambient background reflection.

2. The technique employs the quickly determined information from the narrow band of energy to efficiently extract a larger set of information from the entire band of energy typically found in ambient light.

3. The technique creates a resultant movement database which can be used to reconstruct one or more portions or all of the event after it has concluded by overlaying all captured and extracted object movements back onto a pre-known ice surface background.

This last point is especially beneficial since in practice it allows what otherwise would be a prohibitive amount of event video information to be saved as a minimum set of movement information which can then be transferred via normal system to system connections such as the internet. Thus several individuals involved with an event can separately and easily download this data to their respective remote systems 70 for there own selective replay and analysis. It is even envisioned that only the centers of gravity need to be transmitted as opposed to all object pixels in the minimum bounding box since in a arcade style event replay the graphics of a players body, helmet and stick as well as the puck can easily be generated by the local system.

An additional novel aspect of system 100 is depicted in FIG. 6. Specifically, by the use of pre-designated marked objects such as cone 11 with reflective ink 11a, it is possible to restrict system 100's field of tracking to some sub-portion of its field of view such as 2t. In practice an operator such as an on-ice coach will initiate this reduced tracking mode of system 100 using a special entry code input to tracking control device 90. Device 90 transmits this control sequence via conventional RF to local computer system 60. This information is then provided to composition of multiple overlapping unit 65 that then searches for two or more pre-designated objects, e.g. cones 11, on the ice surface 2. When taken together, these two or more cones 11 will prescribe one or more geometric areas such as 2t within which all tracking is enabled and outside of which all tracking is disabled. In those cases where the cones have been placed in an ambiguous fashion, unit 65 will transmit for display all possible layouts given the current cones 11 detected from which the operator of control device 90 will select the appropriate layout. For example, the coach may simply place two cones 11 on Ice 2, one at either side of the red line that divides the ice surface into two parts. At this point unit 65 will display two possible layouts covering either one side of the ice or the other.

After restricting system 100's tracking area, all other functionality is identical as previously described. Furthermore, quantification and analysis unit 68 is capable of outputting all calculated information to portable tracking control device 90 in response to the on-ice coaches real time inquiries. Unit 68 can be enabled by device 90 to also output the speed of successive shots on goal to a shot clock 91.

The additional teachings of this continuation relate to the placement of a multiplicity of patches or ink marks such as 17af through 17i on a player such as 17 so that when taken together their combined locations work to define a player coordinate system 17cs. The designated origin of the player coordinate system 17o is defined by at least one marking such as 17af. Additional marking 17ab may be added to increase the likelihood that the player's designated origin is in view at all times. Either or both of points 17af and 17ab also work to define the movable horizontal plane 17hp and movable vertical plane 17vp that orient the three-dimensional player coordinate system.

After a player has been suited up with the appropriate equipment and clothing that has been marked as depicted in FIG. 9a, then a calibration process should be performed before tracking is to begin. During the calibration process, an individual player such as 17 will temporarily stand in view of preferably two or more perspective Z cameras while the tracking system locates all special marks such as 17af through 17i. The calibration cameras will themselves be pre-calibrated thereby providing the tracking system with the ability to measure the size of each individual marking such as 17af through 17i as well as their relative locations in a resting position with respect to designated origin 17o. The pre-calibration techniques relied upon to facilitate the machine vision are well defined within the art and typically incorporate some form of a calibration plate with known and precise markings being placed in an exact and know fixed location with respect to the calibration cameras. Given the pre-known and exact locations of the calibration cameras themselves, when taken in combination with the location of the calibration plate and its markings, it is possible to correlate the pixels of the machine vision system with a very precise standard metric.

Once markings 17af through 17i on player 17 have been calibrated, player 17 may then participate in the given activity to be tracked such as a hockey game. As the player moves about the predefined tracking area, the system as previously defined in the primary embodiment now additionally locates markers 17af through 17i. Furthermore, as each frame of information is captured and analyzed, each specific mark such as 17c is translated into a coordinate within the three-dimensional player coordinate system 17cs. For instance, designated origin 17o is determined based upon either or both of captured marks 17af or 17ab. The system then determines the location and orientation of movable horizontal plane 17hp and moveable vertical plane 17vp. Given these calculations, each individual captured mark such as 17c may be expressed as an angle of rotation ($\theta$), angle of azimuth ($\phi$) and distance (r) from designated origin 17o. Between each successive video frame capture, each individual point such as 17af through 17i on each individual player such as 17 is located and subsequently converted into the player coordinate system. Note that player designated origin 17o is itself always translated and expressed as a three-dimensional coordinate with respect to the designated origin of the playing venue as previously described in the primary embodiment.

In FIG. 9a, the points chosen for tracking roughly correspond to the players chest cavity (front and back), their shoulders, elbows, wrists, waist, knees, ankles and feet. When taken together, these represent a total of 16 points of information, for which the system will store coordinates for 14 of these points with respect to player designated origin 17o. In a game such as hockey, there are typically 12 players on the ice at all times which would yield a total of 168 individual points calculated and stored within each frame capture. There are typically two referees and one line judge also on the ice during the game. For each of these individuals, it would only be necessary to track the helmet, one shoulder and both hands making a total of 4 points. This will add 3 times 4 or 12 additional points bringing the total to 180.

Additionally, each player and referee's designated origin such as 17o as well as the puck must itself be calculated with respect to venue's designated origin thereby adding 15 points. Each player will also have a stick that may be defined with one to three points thereby requiring up to 36 more points. The two goalies may require additional marked points to facilitate higher tracking resolution. It may also be desirable to track fixed points on the net itself since it may move during game play. Adding 2 more points on each comer of the net and 5 more for each goalie, the total number of points to track in real time is now 245. If each of the 245 points is expressed as two angles from 0 to 360° and a distance from 0 to 9.999 meters, then at most each point will require 10 bytes of information without any compression algorithm. Therefore, the total number of uncompressed bytes of information would be 10 times 245 or 2,450 bytes. At forty frames per second, the total data stream would reach 98,000 bytes.

However, using a combination of compression algorithms and intelligent choices, the data stream may be further reduced as follows:

1) Using bit encoding it can be seen that it only requires 9 bits to represent 0 to 511 that would suffice for each angle. This same bit encoding could represent from 0 to 255 centimeters in 8 bits which would translate to a distance (r) of between 0 to approximately 8.3 feet which would be sufficient for describing any point on the player such as 17af through 17i. Hence, rather than requiring 10 bytes to store this same information, with bit encoding the total number of bits required would be 2*9+8 or 26 which could be stored as 4 total bytes thereby saving 6 per each point.
2) Because of their fixed relationship to each other, it is possible to record only one of the two shoulders since the location of the second shoulder could be calculated based upon calibration information. This would save 4 additional bytes given the reductions already stated in points 1).
3) By moving the player's designated origin to either of their two shoulders, an additional tracking point could be dropped per player and on-ice referee thereby saving 15 points per frame.
4) Because of the know location of the net as well as its fixed nature, it would be possible to store the two net coordinates as one byte X, Y locations with respect to the crease rather than the center of the venue. This would save 16 additional bytes per net or 32 bytes in all.
5) Given the fixed nature of the stick, it would be possible to track one point on its middle as well as one point on the blade thereby reducing the total points to track for the sticks by 1 times 12. This would save an additional 12 times 10 or 120 bytes.

The first strategy would save 6 additional bytes per each of 14 points, for each of the 12 players and 3 officials. This would be save 1260 bytes per frame. This bit encoding will also save 6 bytes per each additional 5 points on the two goalies, or 60 bytes. The second strategy will save the encoding of one point per each of the 12 players on the ice surface, which at a reduced 4 bytes per point each yields a total of 48 bytes. The third strategy will eliminate one tracking point per each on-ice individual for a total of 15 points times the reduced 4 bytes per point for a total of 60 bytes. Strategy four will eliminate 32 bytes while strategy five yields 120, for a combined total, of 152.

The grand total savings if all of these methods were adopted would be 1,580 bytes. At forty frames a second, this will provide a reduction of 63,200 bytes brining the total stream down to 34,800. Given today's current typical modem transmission rates of 56,000 bytes, this data stream could fit across the Internet in real time.

Assuming the use of higher transmission speeds or a local area network within the rink to be used by the players, coaching staff, broadcasters and fans than it may be desirable to track the further locations of the players and coaches on the bench.

A typical hockey team may also comprise 14 additional players on the bench as well as one or more coaches. Each of these bench individuals could also be tracked to a much lesser degree as follows. Each of the coaches could be followed by one shoulder and two hands, if the coaches needed to be tracked at all. The other players could be tracked by their helmet, one shoulder, two hands and one point on the top of their stick bringing the total points per player to 5 points as opposed to 14 points. Hence, a minimum data stream necessary to include bench activity would include 5 points per 14 players where each point would require 4 bytes for a total of 280 bytes. In addition there would also be 3 points for 2 coaches at 4 bytes each totaling 24 bytes. For each of the 14 players and 2 coaches, one designated origin would also have to be tracked relating their position to the center of the venue. This brings the bench total to 320 that must be doubled to include both benches. At forty frames per second this adds 25,600 bytes. Hence, the total information required to track all on and off-ice activity would be 34,000 plus 25,600 or 59,600 bytes. Cutting the bench information to a minimum by say only tracking each player's head would bring the total stream back under the typical modem bandwidth. Again, this bench information could be simulated for the remote system and is not necessary to transmit for the minimal game coverage.

During a line change there may be players exiting the bench slightly before their on-ice counter part has entered the bench. In these cases, any number of strategies could be followed including a minimal tracking of the player entering or leaving the ice once the "double up" is detected. Since the "in play" data stream was still under the maximum, even allowing for overhead there will be enough room left over in the data stream to accommodate this situation.

Given any of the higher data transmission methods which jump up to 128,000 bytes and beyond, both the activity on the ice and bench could easily be transmitted in real time over the internet to a multiplicity of remote end user PC's. It should be further noted that the tracking system as described in the primary embodiment can and will capture a complete set of information about every marked location on and off the playing surface in real time. This stream may then be further split off into one of many data streams intended for: a) in venue use at high transmission rates, b) Internet use at 128 k or better transmissions and c) Internet use at 56 k transmissions, etc.

In any case, the operation of the new teachings of this continuation proceed in a similar manner once the data stream is received by the remote end user PC. At this point the PC uses standard real time 3-D graphics techniques to recreate the visual effects of the game based upon the actual coordinates provided by the real time data stream. Such graphics can be found in many of the popular PC sports games such as EA Sports NHL 2000. Note that the end user may easily change his frame of reference at any point during the game play by specifying a new viewing coordinate within the virtual venue. For instance, the viewing coordinate could be anywhere in the stands, on the benches, in the penalty box, above the ice or even on the ice such as in the net. Furthermore, the viewing coordinate could be dynamic, such as on a player's helmet providing the end user with the option to watch the game from the player's point of view. In any case, the viewing coordinate can easily be mapped to the center of venue coordinate that is then use to further map every player, their stick, the referees, and the puck as well as perhaps the bench activity.

In addition to the ability to automatically recreate life-like accurate game views, this data stream provides the opportunity to gather a wealth of game statistics such as ice time, faces off win percentages, shots on goal, puck control, etc. All of these statistics are available by the analysis of the downloaded real time data stream.

CONCLUSION, RAMIFICATIONS, AND SCOPE OF INVENTION

Thus the reader will see that the continuation to the Multiple Object Tracking System provides a novel apparatus and method for:

1—providing a system for capturing the three dimensional relative locations of selected points of interest on each participant, equipment and/or game object during the live event without human assistance;

2—providing a system for automatically translating these selected points of interest into a compressed data set referred to as a player coordinate system;

3—providing a system for automatically transmitting this compressed data set in real time over the internet or other communications network;

4—providing a system for automatically receiving and then selectively decompressing the transmitted data set into a life-like representation of the original event; and 5—providing a system whereby the end user can dynamically change their point of view to any fixed or moving position within the virtual event field-of-play and where all of the previously mentioned capabilities are conducted in real-time.

While the above description contains many specifications, these should not be construed as limitations on the scope of the invention, but rather as an exemplification of the preferred embodiments thereof. Many aspects of the system's functionality are beneficial by themselves without other aspects being present. For instance, tracking of the waist marks on a player could be eliminated while still providing for accurate game reconstruction. Variations on the player coordinate system are possible including using the pelvic cavity or one of the shoulders as the player origin rather than the chest. What remains novel is the system of relating a player's key joints to their designated origin in a player's coordinate system while also relating the player's designated origin to the center of the venue. This system provides a method for greatly reducing the data stream of information necessary to represent the game in real time to end user's on remote PC's. This system further provides a method for allowing the end user to dynamically change their viewing perspective and to view a multiplicity of new game statistics. The process of first calibrating a player to measure and relate all of their marked data points is also considered to be novel to this invention.

It is evident from the description of this continuation to the Multiple Object Tracking System that it has applicability beyond that of tracking the movements of hockey players and the puck during an ice hockey game. This system could be used for other sports such as figure skating, football, basketball, soccer, baseball, car racing, golf, etc. Note that in some of these sports either clothing or equipment may not cover certain spots of the body, such as the head. This will make it difficult to track such points with the special reflective ink. In such cases, other approaches could be used such as marked headbands.

From the foregoing detailed description of the present invention, the Multiple Object Tracking System, it will be apparent that the invention has a number of advantages, some of which have been described above and others that are inherent in the invention. Also, it will be apparent that modifications can be made to the Multiple Object Tracking System without departing from the teachings of the invention. Accordingly, the scope of the invention is only to be limited as necessitated by the accompanying claims.

What is claimed is:

1. A live performance viewing and analysis system comprising:

a tracking system for continuously tracking the location of multiple body points on one and more players in a defined physical space; and a computer operatively coupled to the tracking system for updating in real time the virtual location of all tracked body points on each one and more players in a virtual space corresponding to the physical location of all tracked body points on each one and more players in the physical space, for updating a view of the virtual space, and for providing at least one indicium of performance of the one and more players moving in the physical space, wherein the at least one indicium is or is derived from a measure of a movement parameter of the one and more players.

2. The live performance viewing and analysis system of claim 1 wherein the performance is digitally compressed into a first coordinate system of body point locations expressed relative to a corresponding player's origin and then digitally compressed into a second coordinate system of player origins expressed relative to the corresponding physical space origin.

3. The live performance viewing and analysis system of claim 2 wherein the view presented through the operatively coupled computer of the one and more players can be controllably changed to match any desired perspective based upon the digitally compressed first and second coordinate systems.

4. The live performance viewing and analysis system of claim 1 wherein the tracking system further tracks the location and movement of player equipment and the contest object such as a puck or ball.

5. The live performance viewing and analysis system of claim 4 further providing at least one indicium indicative of the movement of equipment and or the contest object.

6. The live performance viewing and analysis system of claim 1 wherein the tracking system further comprises an automated system for following the movement of one and more players within a predefined area using an energy source that emits energy at least including a narrow band of tracking energy, the system comprising:
one and more marks placed upon the one and more players that reflect only the narrow band of tracking energy;
one and more tracking detectors placed throughout the predefined area that receive the reflected narrow band of tracking energy; and
a computer system responsive to the detectors that analyzes the narrow band of tracking energy received by the detectors and creates a database of movement information related to the one and more marks placed upon the one and more players.

7. The automated system of claim 6 wherein the narrow band of tracking energy is non-visible.

8. The automated system of claim 7 further comprising one and more lamps emitting the narrow band of non-visible tracking energy.

9. The automated system of claim 8 wherein the one and more lamps are physically separated from the one and more detectors.

10. The automated system of claim 6 wherein the narrow band of tracking energy is constantly radiated, reflected, and received without interruption.

11. The automated system of claim 6 wherein the one and more marks are embedded onto the surface of the one and more players.

12. The automated system of claim 11 wherein the one and more marks are optionally embedded onto the surface of a material that is attached to the one and more players in such a way that it remains flat to the surface of the object.

13. The automated system of claim 6 wherein one or more of the marks placed upon each object bears indicia uniquely identifying that object.

14. The automated system of claim 13 wherein the computer system determines the identity of each object based solely upon the information obtained from the one or more indicia bearing marks.

15. The automated system of claim 13 wherein the detectors are one and more first tracking cameras arranged in a grid formation overhead of the predefined area where the one and more players move, the first tracking cameras being used to track the X-Y movement of the one and more players.

16. The automated system of claim 15 wherein at least one of the one or more indicia bearing marks are placed upon a top surface of each of the one and more players such that it is consistently in the view of the overhead first tracking cameras.

17. The automated system of claim 16 wherein the computer system determines the identity of each object based solely upon the information obtained from the at least one indicia bearing mark that was placed upon the top of each one and more object as viewed through the grid of overhead first tracking X-Y cameras.

18. The automated system of claim 6 wherein the detectors are one and more first tracking cameras arranged in a grid formation overhead of the predefined area where the one and more players move, the first tracking cameras being used to track the X-Y movement of the one and more players.

19. The automated system of claim 18 wherein additional detectors in the form of one and more second tracking cameras are placed at perspective views to the movement of the one and more players.

20. The automated system of claim 19 wherein additional detectors in the form of one and more filming cameras are included in order to receive visible light images corresponding to the non-visible light images received by the first and second tracking cameras.

21. The automated system of claim 19 wherein the computer determines Z dimension information about the one and more marks placed upon each of the one and more players based upon images from the one and more second tracking cameras.

22. The automated system of claim 21 wherein the one and more first and second tracking cameras are further fitted with a lens filter to block visible light.

23. The automated system of claim 20 wherein the computer system receives the visible light images from the filming cameras and stores these images cross-indexed with the tracking information obtained from the first and second tracking cameras.

24. The automated system of claim 23 wherein the location information determined by the computer system using the images of the first and second tracking cameras and pertaining to any and all marks is used to selectively process a portion of the images of the filming cameras by performing a comparison of these images to the pre-known background thereby identifying a foreground object without having to process all the pixels of the images.

25. The automated system of claim wherein the location of each mark is tracked individually.

26. The automated system of claim 5 wherein the shape of the one and more marks provides information about the object's orientation.

27. The automated system of claim 26 wherein the spatial arrangement of the one and more marks provides information about the object's orientation.

28. The automated system of claim 27 wherein the information calculated by the computer system concerning the location of the one and more marks and therefore of the location of the one and more players onto which the marks have been placed comprises the current location, direction of movement, velocity, acceleration, and orientation of the object associated with the time the images were captured from which the information was determined.

29. The automated system of claim 14 wherein the information calculated by the computer system is automatically stored in a database cross-linked to and retrievable by the identified object.

30. The automated system of claim 29 wherein the information calculated and automatically stored in the database by the computer system is further analyzed to create new comparison information that is also stored in the database.

31. The automated system of claim 30 further comprising a remote computer system and wherein the information calculate and automatically stored in the database by the computer system as well as the new comparison information is transmittable to the remote computer system.

32. The automated system of claim 31 wherein the remote computer system is capable of recreating a graphic representation of the movement of the tracked players based upon the transmitted information.

\* \* \* \* \*